United States Patent
Siminoff

(10) Patent No.: US 10,666,913 B1
(45) Date of Patent: May 26, 2020

(54) INPUT FUNCTIONALITY FOR AUDIO/VIDEO RECORDING AND COMMUNICATION DOORBELLS

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/122,652

(22) Filed: Sep. 5, 2018

Related U.S. Application Data

(60) Provisional application No. 62/554,520, filed on Sep. 5, 2017.

(51) Int. Cl.
| | | |
|---|---|---|
| *H04M 11/04* | (2006.01) | |
| *H04N 7/18* | (2006.01) | |
| *G08B 21/18* | (2006.01) | |
| *G06K 9/00* | (2006.01) | |
| *G10L 15/00* | (2013.01) | |
| *E05B 47/00* | (2006.01) | |

(52) U.S. Cl.
CPC ......... *H04N 7/186* (2013.01); *E05B 47/0001* (2013.01); *G06K 9/00006* (2013.01); *G06K 9/00221* (2013.01); *G06K 9/00597* (2013.01); *G08B 21/18* (2013.01); *G10L 15/00* (2013.01); *H04N 7/188* (2013.01)

(58) Field of Classification Search
CPC .... H04N 7/186; H04N 7/188; E05B 47/0001; G06K 9/00597; G06K 9/00006; G06K 9/00221; G08B 21/18; G10L 15/00
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | von Bauer et al. |
| (Continued) | | |

FOREIGN PATENT DOCUMENTS

| | | |
|---|---|---|
| CN | 2585521 Y | 11/2003 |
| CN | 2792061 Y | 6/2006 |
| (Continued) | | |

*Primary Examiner* — Howard D Brown, Jr.
(74) *Attorney, Agent, or Firm* — Greenberg Traurig, LLP

(57) ABSTRACT

Input functionality for audio/video (A/V) recording and communication doorbells in accordance with various embodiments of the present disclosure are provided. In one embodiment, an A/V recording and communication doorbell is provided, comprising: a button, a camera, a microphone, a communication module, one or more processors, and a non-transitory machine-readable memory storing a program, the program executable by at least one of the processors, the program comprising sets of instructions for: receiving, by the button, an input and generating, in response to the input, input data; determining, based on the input data, whether the input is received for a threshold period of time; upon determining that the input is received for the threshold period of time, establishing, a connection to a security monitoring service; and in response to establishing the connection, initiating a two-way audio communication between the security monitoring service and the A/V recording and communication doorbell.

21 Claims, 15 Drawing Sheets

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 * | 7/2014 | Scalisi ........... H04N 7/186 348/143 |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 * | 2/2016 | Harrison ........... H04M 1/0291 |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0163463 A1 * | 6/2015 | Hwang ........... H04N 7/188 348/143 |
| 2018/0139332 A1 * | 5/2018 | Kerzner ........... G08B 13/19684 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

INPUT FUNCTIONALITY FOR AUDIO/VIDEO RECORDING AND COMMUNICATION DOORBELLS

CROSS-REFERENCE TO RELATED APPLICATION

This application claims priority to provisional application Ser. No. 62/554,520, filed on Sep. 5, 2017, the entire contents of which are hereby incorporated by reference.

TECHNICAL FIELD

The present embodiments relate to security systems, including security systems that include sensors, automation devices, and/or audio/video (A/V) recording and communication devices. In particular, the present embodiments relate to improvements in the functionality of security systems that strengthen the ability of such systems to reduce crime and enhance public safety.

BACKGROUND

Home safety is a concern for many homeowners and renters. Those seeking to protect or monitor their homes often wish to be informed of breaches to the security of their homes and also have video and audio communications with visitors/trespassers, for example, those visiting/trespassing near an external door or entryway. Security systems that include sensors, automation devices, and/or A/V recording and communication devices, such as doorbells, provide this functionality, and can also aid in crime detection and prevention. For example, sensor information, audio, and/or video captured by a security system, such as by an A/V recording and communication doorbell of a security system, can be uploaded to the cloud and recorded on a remote server. Subsequent review of the sensor information and/or the A/V footage can aid law enforcement in capturing perpetrators of home burglaries and other crimes. Further, the presence of a security system including one or more an A/V recording and communication devices on the exterior of a home, such as a doorbell unit at the entrance of a home, acts as a powerful deterrent against would-be burglars.

SUMMARY

The various embodiments of the present input functionality for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that, historically, doorbell buttons, including doorbell buttons of video doorbells, have primarily been used for the purpose of triggering a notification to a user/owner of the doorbell (e.g., the resident of a property where the doorbell is installed) that a person is present at the property. However, as video doorbells have become more integrated with home automation and security systems, video doorbells, other than the present embodiments, have not leveraged the functionality of video doorbells to provide additional functionality to the doorbell button beyond its traditional use (e.g., triggering a visual or audible notification of the presence of a person).

The present embodiments solve this problem by leveraging the functionality of the doorbell button of video doorbells to interact with home automation devices, home security systems, and/or to establish two-way communication between the video doorbell and a security monitoring service. For example, in some embodiments, in response to an input to the doorbell button, a person may provide a command input to the video doorbell (e.g., an audible input, a gesture input, etc.) for unlocking/locking a door, arming/disarming a security system, and/or initiating communication with a security monitoring service for requesting access to a property where the video doorbell is installed. As a result, the user/owner of the video doorbell and/or guests of the property where the video doorbell is installed, may have an additional platform (e.g., directly through the video doorbell based on an input to the doorbell button) for communicating with a security system, accessing the property, and/or contacting a security monitoring service, for example. Ultimately, because of this increased functionality, the user/owner of the video doorbell may be more likely to arm their security system and/or lock their doors, thereby contributing the security of the property where the video doorbell is located.

In a first aspect, an audio/video (A/V) recording and communication doorbell including a processor, a button, a communication module, a camera, and a microphone, receives, by the button, an input and generating, by the processor in response to the input, input data; determines, by the processor based on the input data, whether the input is received for a threshold period of time; upon determining the input is received for the threshold period of time, activates, by the processor, a command input mode; in response to entering the command input mode, receives, by at least one of the microphone and the camera, a command input; in response to receiving the command input, analyzes, by the processor, the command input to determine an action; and based on the determination, executes, by the processor using the communication module, the action.

In an embodiment of the first aspect, the input includes at least one of a touch of the button and a press of the button.

In another embodiment of the first aspect, the A/V recording and communication doorbell further includes a biometric scanner.

In another embodiment of the first aspect, the biometric scanner includes at least one of a fingerprint scanner and an eye scanner.

In another embodiment of the first aspect, the button includes the biometric scanner.

In another embodiment of the first aspect, the A/V recording and communication doorbell further includes biometric capabilities.

In another embodiment of the first aspect, the biometric capabilities include at least one of fingerprint recognition, eye recognition, voice recognition, and facial recognition.

In another embodiment of the first aspect, analyzing the command input to determine an action includes determining, by the processor based on biometric data generated using the biometric capabilities, whether the command input is received from an authorized person.

In another embodiment of the first aspect, determining whether the command input is received from an authorized person includes comparing, by the processor, the biometric data to a biometric database.

In another embodiment of the first aspect, the threshold period of time is configurable by a user of the A/V recording and communication doorbell.

In another embodiment of the first aspect, the A/V recording and communication doorbell further comprises a speaker, and wherein if the input is received for less than the threshold period of time, the processor using the speaker, emits a tone.

In another embodiment of the first aspect, in addition to emitting the tone, the processor using the communication module, generates and transmits a user alert to a client device associated with the A/V recording and communication doorbell.

In another embodiment of the first aspect, the command input includes at least one of a voice input and a gesture input.

In another embodiment of the first aspect, the voice input includes a code, a password, or a passphrase.

In another embodiment of the first aspect, the gesture input is indicative of the action.

In another embodiment of the first aspect, the action includes one of changing an arming status of a security system, unlocking/locking a door, and contacting a security monitoring service.

In another embodiment of the first aspect, the A/V recording and communication doorbell further includes a speaker, and wherein in response to entering the command input mode, the processor using the speaker, generates an audible request for the command input.

In another embodiment of the first aspect, the A/V recording and communication doorbell further includes a light display, and wherein in response to entering the command input mode, the processor using the light display, generates a visible request for the command input.

In a second aspect, an audio/video (A/V) recording and communication doorbell comprising: a button; a camera; a microphone; a communication module; one or more processors; and a non-transitory machine-readable memory storing a program, the program executable by at least one of the processors, the program comprising sets of instructions for: receiving, by the button, an input and generating, in response to the input, input data; determining, based on the input data, whether the input is received for a threshold period of time; upon determining the input is received for the threshold period of time, activating a command input mode; in response to entering the command input mode, receiving, by at least one of the microphone and the camera, a command input; in response to receiving the command input, analyzing the command input to determine an action; and based on the determination, executing, using the communication module, the action.

In an embodiment of the second aspect, the input includes at least one of a touch of the button and a press of the button.

In another embodiment of the second aspect, the A/V recording and communication doorbell further includes a biometric scanner.

In another embodiment of the second aspect, the biometric scanner includes at least one of a fingerprint scanner and an eye scanner.

In another embodiment of the second aspect, the button includes the biometric scanner.

In another embodiment of the second aspect, the A/V recording and communication doorbell further comprises biometric capabilities.

In another embodiment of the second aspect, the biometric capabilities include at least one of fingerprint recognition, eye recognition, voice recognition, and facial recognition.

In another embodiment of the second aspect, analyzing the command input to determine an action includes determining, based on biometric data generated using the biometric capabilities, whether the command input is received from an authorized person.

In another embodiment of the second aspect, determining whether the command input is received from an authorized person includes comparing the biometric data to a biometric database.

In another embodiment of the second aspect, the threshold period of time is configurable by a user of the A/V recording and communication doorbell.

In another embodiment of the second aspect, the A/V recording and communication doorbell further comprises a speaker, and the program further comprises sets of instructions for, if the input is received for less than the threshold period of time, emitting, using the speaker, a tone.

In another embodiment of the second aspect, the program further comprises sets of instructions for generating and transmitting, using the communication module, a user alert to a client device associated with the A/V recording and communication doorbell.

In another embodiment of the second aspect, the command input includes at least one of a voice input and a gesture input.

In another embodiment of the second aspect, the voice input includes a code, a password, or a passphrase.

In another embodiment of the second aspect, the gesture input is indicative of the action.

In another embodiment of the second aspect, the action includes one of changing an arming status of a security system, unlocking/locking a door, and contacting a security monitoring service.

In another embodiment of the second aspect, the A/V recording and communication doorbell further comprises a speaker, and the program further comprises sets of instructions for, in response to entering the command input mode, generating, using the speaker, an audible request for the command input.

In another embodiment of the second aspect, the A/V recording and communication doorbell further includes a light display, and wherein the program further comprises sets of instructions for, in response to entering the command input mode, generating, using the light display, a visible request for the command input.

In a third aspect, an audio/video (A/V) recording and communication doorbell including a processor, a button, a communication module, a camera, and a microphone, receives, by the button, an input and generating, by the processor in response to the input, input data; compares, by the processor, the input data to an input database to determine an input response; upon determining that, based on the comparing the input data to the input database, the input response includes an automatic action, executes, by the processor using the communication module, the automatic action; and upon determining that, based on the comparing the input to the input database, the input response includes a command input mode: activates, by the processor, the command input mode; in response to activating the command input mode, receives, by at least one of the microphone and the camera, a command input; in response to receiving the command input, analyzes, by the processor, the command input to determine an action; and based on the determination, executes, by the processor using the communication module, the action.

In an embodiment of the third aspect, the input includes at least one of a touch of the button and a press of the button.

In another embodiment of the third aspect, the A/V recording and communication doorbell further includes a biometric scanner.

In another embodiment of the third aspect, the biometric scanner includes at least one of a fingerprint scanner and an eye scanner.

In another embodiment of the third aspect, the button includes the biometric scanner.

In another embodiment of the third aspect, the A/V recording and communication doorbell further includes biometric capabilities.

In another embodiment of the third aspect, the biometric capabilities include at least one of fingerprint recognition, eye recognition, voice recognition, and facial recognition.

In another embodiment of the third aspect, the input data further includes biometric data generated using the biometric capabilities, and wherein comparing the input data to the input database includes determining, by the processor based on the input data, whether the command input is received from an authorized person.

In another embodiment of the third aspect, the command input includes at least one of a voice input and a gesture input.

In another embodiment of the third aspect, the voice input includes a code, a password, or a passphrase.

In another embodiment of the third aspect, the gesture input is indicative of the action.

In another embodiment of the third aspect, the action includes one of changing an arming status of a security system, unlocking/locking a door, and contacting a security monitoring service.

In another embodiment of the third aspect, the automatic action includes one of changing an arming status of a security system, unlocking/locking a door, and contacting a security monitoring service.

In another embodiment of the third aspect, the A/V recording and communication doorbell further includes a speaker, and wherein in response to entering the command input mode, the processor using the speaker, generates an audible request for the command input In another embodiment of the third aspect, the A/V recording and communication doorbell further includes a light display, and wherein in response to entering the command input mode, the processor using the light display, generates a visible request for the command input.

In another embodiment of the third aspect, the input response is determined based on at least one of a duration of the input, a number of inputs, and a pattern of the input from the input data.

In a fourth aspect, an audio/video (A/V) recording and communication doorbell comprises: a button; a camera; a microphone; a communication module; one or more processors; and a non-transitory machine-readable memory storing a program, the program executable by at least one of the processors, the program comprising sets of instructions for: receiving, by the button, an input and generating, in response to the input, input data; comparing the input data to an input database to determine an input response; upon determining that, based on the comparing the input data to the input database, the input response includes an automatic action, executing, using the communication module, the automatic action; and upon determining that, based on the comparing the input to the input database, the input response includes a command input mode: activating the command input mode; in response to activating the command input mode, receiving, by at least one of the microphone and the camera, a command input; in response to receiving the command input, analyzing the command input to determine an action; and based on the determination, executing, using the communication module, the action.

In an embodiment of the fourth aspect, the input includes at least one of a touch of the button and a press of the button.

In another embodiment of the fourth aspect, the A/V recording and communication doorbell further comprises a biometric scanner.

In another embodiment of the fourth aspect, the biometric scanner includes at least one of a fingerprint scanner and an eye scanner.

In another embodiment of the fourth aspect, the button includes the biometric scanner.

In another embodiment of the fourth aspect, the A/V recording and communication doorbell further comprises biometric capabilities.

In another embodiment of the fourth aspect, the biometric capabilities include at least one of fingerprint recognition, eye recognition, voice recognition, and facial recognition.

In another embodiment of the fourth aspect, the input data further includes biometric data generated using the biometric capabilities; and comparing the input data to the input database includes determining, based on the input data, whether the command input is received from an authorized person.

In another embodiment of the fourth aspect, command input includes at least one of a voice input and a gesture input.

In another embodiment of the fourth aspect, the voice input includes a code, a password, or a passphrase.

In another embodiment of the fourth aspect, the gesture input is indicative of the action.

In another embodiment of the fourth aspect, the action includes one of changing an arming status of a security system, unlocking/locking a door, and contacting a security monitoring service.

In another embodiment of the fourth aspect, the automatic action includes one of changing an arming status of a security system, unlocking/locking a door, and contacting a security monitoring service.

In another embodiment of the fourth aspect, the A/V recording and communication doorbell further comprises a speaker, and the program further includes sets of instructions for, in response to entering the command input mode, generating, using the speaker, an audible request for the command input.

In another embodiment of the fourth aspect, the A/V recording and communication doorbell further comprises a light display, and the program further includes sets of instructions for, in response to entering the command input mode, generating, using the light display, a visible request for the command input.

In another embodiment of the fourth aspect, the input response is determined based on at least one of a duration of the input, a number of inputs, and a pattern of the input from the input data.

In a fifth aspect, an audio/video (A/V) recording and communication doorbell including a processor, a button, a communication module, a camera, and a microphone, activates, by the processor, the camera to record image data in a field of view of the camera; receives, by the button, an input and generating, by the processor in response to the input, input data; determines, by the processor based on the input data, whether the input is received for a threshold period of time; and upon determining that the input is received for the threshold period of time, activates, by the processor, a command input mode, the command input mode configuring the processor to: analyze the image data to determine if an authorized person is present; receive, by at least one of the microphone and the camera, a command input; in response to receiving the command input and determining that an authorized person is present, analyze the command input to determine an action; and based on the determination, execute, using the communication module, the action.

In an embodiment of the fifth aspect, the camera is activated to record the image data in response to the A/V recording and communication doorbell detecting the motion in a field of view of the A/V recording and communication doorbell.

In another embodiment of the fifth aspect, the A/V recording and communication doorbell detects the motion using one of the camera and a motion sensor of the A/V recording and communication doorbell.

In another embodiment of the fifth aspect, the input includes at least one of a touch of the button and a press of the button.

In another embodiment of the fifth aspect, the A/V recording and communication doorbell further includes a biometric scanner.

In another embodiment of the fifth aspect, the biometric scanner includes at least one of a fingerprint scanner and an eye scanner.

In another embodiment of the fifth aspect, the button includes the biometric scanner.

In another embodiment of the fifth aspect, the A/V recording and communication doorbell further includes biometric capabilities.

In another embodiment of the fifth aspect, the biometric capabilities include at least one of fingerprint recognition, eye recognition, voice recognition, and facial recognition.

In another embodiment of the fifth aspect, determining if an authorized person is present includes: generating, by the processor using the biometric capabilities, biometric data of a person in the field of view of the camera; and comparing, by the processor, the biometric data to a biometric database to determine if the person is an authorized person.

In another embodiment of the fifth aspect, the biometric capability includes facial recognition, the biometric data includes first facial image data of the person, and the biometric database includes a facial image database including facial image data of authorized persons.

In another embodiment of the fifth aspect, the threshold period of time is configurable by a user of the A/V recording and communication doorbell.

In another embodiment of the fifth aspect, the A/V recording and communication doorbell further comprises a speaker, and wherein if the input is received for less than the threshold period of time, the processor using the speaker, emits a tone.

In another embodiment of the fifth aspect, in addition to emitting the tone, the processor using the communication module, generates and transmits a user alert to a client device associated with the A/V recording and communication doorbell.

In another embodiment of the fifth aspect, the command input includes at least one of a voice input and a gesture input.

In another embodiment of the fifth aspect, the voice input includes a code, a password, or a passphrase.

In another embodiment of the fifth aspect, the gesture input is indicative of the action.

In another embodiment of the fifth aspect, the action includes one of changing an arming status of a security system, unlocking/locking a door, and contacting a security monitoring service.

In another embodiment of the fifth aspect, the A/V recording and communication doorbell further includes a speaker, and wherein in response to entering the command input mode, the processor using the speaker, generates an audible request for the command input.

In another embodiment of the fifth aspect, the A/V recording and communication doorbell further includes a light display, and wherein in response to entering the command input mode, the processor using the light display, generates a visible request for the command input.

In a sixth aspect, an audio/video (A/V) recording and communication doorbell comprises: a button; a camera; a microphone; a communication module; one or more processors; and a non-transitory machine-readable memory storing a program, the program executable by at least one of the processors, the program comprising sets of instructions for: activating the camera to record image data in a field of view of the camera; receiving, by the button, an input and generating, in response to the input, input data; determining, based on the input data, whether the input is received for a threshold period of time; and upon determining that the input is received for the threshold period of time, activating a command input mode, the command input mode configured to: analyze the image data to determine if an authorized person is present; receive, by at least one of the microphone and the camera, a command input; in response to receiving the command input and determining that an authorized person is present, analyze the command input to determine an action; and based on the determination, execute, using the communication module, the action.

In an embodiment of the sixth aspect, the camera is activated to record the image data in response to the A/V recording and communication doorbell detecting the motion in a field of view of the A/V recording and communication doorbell.

In another embodiment of the sixth aspect, the A/V recording and communication doorbell detects the motion using one of the camera and a motion sensor.

In another embodiment of the sixth aspect, the input includes at least one of a touch of the button and a press of the button.

In another embodiment of the sixth aspect, the A/V recording and communication doorbell further comprises a biometric scanner.

In another embodiment of the sixth aspect, the biometric scanner includes at least one of a fingerprint scanner and an eye scanner.

In another embodiment of the sixth aspect, the button includes the biometric scanner.

In another embodiment of the sixth aspect, the A/V recording and communication doorbell further comprises biometric capabilities.

In another embodiment of the sixth aspect, the biometric capabilities include at least one of fingerprint recognition, eye recognition, voice recognition, and facial recognition.

In another embodiment of the sixth aspect, determining if an authorized person is present includes: generating, by the processor using the biometric capabilities, biometric data of a person in the field of view of the camera; and comparing the biometric data to a biometric database to determine if the person is an authorized person.

In another embodiment of the sixth aspect, the biometric capability includes facial recognition, the biometric data includes first facial image data of the person, and the biometric database includes a facial image database including facial image data of authorized persons.

In another embodiment of the sixth aspect, the threshold period of time is configurable by a user of the A/V recording and communication doorbell.

In another embodiment of the sixth aspect, the A/V recording and communication doorbell further comprises a speaker, and if the input is received for less than the threshold period of time, the program further comprises sets of instructions for emitting, using the speaker, a tone.

In another embodiment of the sixth aspect, in addition to emitting the tone, the program further includes sets of instructions for generating and transmitting, using the communication module, a user alert to a client device associated with the A/V recording and communication doorbell.

In another embodiment of the sixth aspect, the command input includes at least one of a voice input and a gesture input.

In another embodiment of the sixth aspect, the voice input includes a code, a password, or a passphrase.

In another embodiment of the sixth aspect, the gesture input is indicative of the action.

In another embodiment of the sixth aspect, the action includes one of changing an arming status of a security system, unlocking/locking a door, and contacting a security monitoring service.

In another embodiment of the sixth aspect, the A/V recording and communication doorbell further comprises a speaker, and the program further includes sets of instructions for in response to entering the command input mode, generating, using the speaker, an audible request for the command input.

In another embodiment of the sixth aspect, the A/V recording and communication doorbell further comprises a light display, and the program further includes sets of instructions for, in response to entering the command input mode, generating, using the light display, a visible request for the command input.

In a seventh aspect, a method is provided for a security system monitored by a security monitoring service and including an audio/video (A/V) recording and communication doorbell, the doorbell including a processor, a button, a communication module, a speaker, and a microphone, the method comprising: receiving, by the button, an input and generating, by the processor in response to the input, input data; determining, by the processor based on the input data, whether the input is received for a threshold period of time; when the input is received for the threshold period of time, establishing, by the processor, a connection to the security monitoring service; and in response to establishing the connection, initiating, by the processor using the communication module, the microphone, and the speaker, a two-way audio communication between the security monitoring service and the A/V recording and communication doorbell.

In an embodiment of the seventh aspect, the input includes at least one of a touch of the button and a press of the button.

In another embodiment of the seventh aspect, the A/V recording and communication doorbell further includes biometric capabilities.

In another embodiment of the seventh aspect, the biometric capabilities include at least one of fingerprint recognition, eye recognition, voice recognition, and facial recognition.

In another embodiment of the seventh aspect, after establishing the connection, the method further comprises: generating, by the processor using the biometric capabilities, biometric data of a person in a field of view of the A/V recording and communication doorbell; determining, by the processor based on the biometric data, an identification of the person; and transmitting, by the processor using the communication module, the identification of the person to the security monitoring service.

In another embodiment of the seventh aspect, determining the identification of the person includes comparing, by the processor, the biometric data to a biometric database.

In another embodiment of the seventh aspect, the threshold period of time is configurable by a user of the A/V recording and communication doorbell.

In another embodiment of the seventh aspect, the method further comprises: receiving, by the processor using the communication module, from the security monitoring service, an action; and executing, using the communication module, the action.

In another embodiment of the seventh aspect, the action includes one of changing an arming status of a security system and unlocking/locking a door.

In an eighth aspect, a method is provided for a security system including an audio/video (A/V) recording and communication doorbell, the doorbell including a processor, a button, a communication module, a camera, a speaker, and a microphone, the method comprising: receiving, by the button, an input and generating, by the processor in response to the input, input data; comparing, by the processor, the input data to an input database to determine an input response; based on the determination of the input response, activating an arming mode, the arming mode configuring the processor to: receive, by at least one of the microphone and the camera, an arming input; in response to receiving the arming input, determine an arming status of the security system; based on the arming input and the arming status, determine an arming action for the security system; and execute, using the communication module, the arming action.

In an embodiment of the eighth aspect, executing the arming action includes transmitting an arming status update request to a hub device of the security system.

In another embodiment of the eighth aspect, the arming status update request is transmitted to the hub device via a backend device.

In another embodiment of the eighth aspect, the backend device is one of a backend server, a backend API, and a storage device.

In another embodiment of the eighth aspect, the input includes at least one of a touch of the button and a press of the button.

In another embodiment of the eighth aspect, the arming action includes updating the arming status of the security system to an updated arming status.

In another embodiment of the eighth aspect, the arming input includes one of a voice input and a gesture input.

In another embodiment of the eighth aspect, when the arming input is a first arming input and the arming status is a first arming status, the arming action includes a first arming action; and when the arming input is the first arming input and the arming status is a second arming status, the arming action includes a second arming action.

In another embodiment of the eighth aspect, the arming status and the updated arming status include one of disarmed, armed stay, armed away, armed vacation, and a custom arming status.

In a ninth aspect, an audio/video (A/V) recording and communication doorbell is provided, the A/V recording and communication doorbell comprising: a button; a camera; a microphone; a communication module; one or more processors; and a non-transitory machine-readable memory storing a program, the program executable by at least one of the processors, the program comprising sets of instructions for: receiving, by the button, an input and generating, by the processor in response to the input, input data; determining, by the processor based on the input data, whether the input is received for a threshold period of time; upon determining that the input is received for the threshold period of time, establishing, by the processor using the communication module, a connection to a security monitoring service; and in response to establishing the connection, initiating, by the processor using the communication module, the microphone, and the speaker, a two-way audio communication between the security monitoring service and the A/V recording and communication doorbell.

In an embodiment of the ninth aspect, the input includes at least one of a touch of the button and a press of the button.

In another embodiment of the ninth aspect, the A/V recording and communication doorbell further includes biometric capabilities.

In another embodiment of the ninth aspect, the biometric capabilities include at least one of fingerprint recognition, eye recognition, voice recognition, and facial recognition.

In another embodiment of the ninth aspect, the program further comprises a set of instructions for: generating, by the processor using the biometric capabilities, biometric data of a person in a field of view of the A/V recording and communication doorbell; determining, by the processor based on the biometric data, an identification of the person; and transmitting, by the processor using the communication module, the identification of the person to the security monitoring service.

In another embodiment of the ninth aspect, determining the identification of the person includes comparing, by the processor, the biometric data to a biometric database.

In another embodiment of the ninth aspect, the threshold period of time is configurable by a user of the A/V recording and communication doorbell.

In another embodiment of the ninth aspect, the program further comprises a set of instructions for: receiving, by the processor using the communication module, from the security monitoring service, an action; and executing, using the communication module, the action.

In another embodiment of the ninth aspect, the action includes one of changing an arming status of a security system and unlocking/locking a door.

In another embodiment of the ninth aspect, the program further comprises a set of instructions for: activating, by the processor, the camera to record image data in a field of view of the camera; and transmitting, by the processor using the communication module, the image data to the security monitoring service.

In a tenth aspect, a method for a security system monitored by a security monitoring service and including an audio/video (A/V) recording and communication doorbell is provided, the A/V recording and communication doorbell including a processor, a button, a camera, a communication module, a speaker, and a microphone, the method comprising: activating, by the processor, the camera to record image data in a field of view of the camera; receiving, by the button, an input and generating, by the processor in response to the input, input data; determining, by the processor based on the input data, whether the input is received for a threshold period of time; determining, by the processor based on the image data, whether an authorized person is present; upon determining that the input is received for the threshold period of time and determining that an authorized person is present, establishing, by the processor using the communication module, a connection to the security monitoring service; and in response to establishing the connection, initiating, by the processor using the communication module, the microphone, and the speaker, a two-way audio communication between the security monitoring service and the A/V recording and communication doorbell.

In an embodiment of the tenth aspect, the input includes at least one of a touch of the button and a press of the button.

In another embodiment of the tenth aspect, the A/V recording and communication doorbell further includes biometric capabilities.

In another embodiment of the tenth aspect, the biometric capabilities include at least one of fingerprint recognition, eye recognition, voice recognition, and facial recognition.

In another embodiment of the tenth aspect, the method further comprises generating, by the processor using the biometric capabilities, biometric data of a person in a field of view of the A/V recording and communication doorbell; determining, by the processor based on the biometric data, an identification of the person; and transmitting, by the processor using the communication module, the identification of the person to the security monitoring service.

In another embodiment of the tenth aspect, determining the identification of the person includes comparing, by the processor, the biometric data to a biometric database.

In another embodiment of the tenth aspect, the threshold period of time is configurable by a user of the A/V recording and communication doorbell.

In another embodiment of the tenth aspect, the method further comprises: receiving, by the processor using the communication module, from the security monitoring service, an action; and executing, using the communication module, the action.

In another embodiment of the tenth aspect, the action includes one of changing an arming status of a security system and unlocking/locking a door.

In another embodiment of the tenth aspect, the method further comprises transmitting, by the processor using the communication module, the image data to the security monitoring service.

BRIEF DESCRIPTION OF THE DRAWINGS

The various embodiments of the present input functionality for A/V recording and communication devices now will be discussed in detail with an emphasis on highlighting the advantageous features. These embodiments depict the novel and non-obvious input functionality for A/V recording and communication devices shown in the accompanying drawings, which are for illustrative purposes only. These drawings include the following figures, in which like numerals indicate like parts.

DETAILED DESCRIPTION

Figure 1:
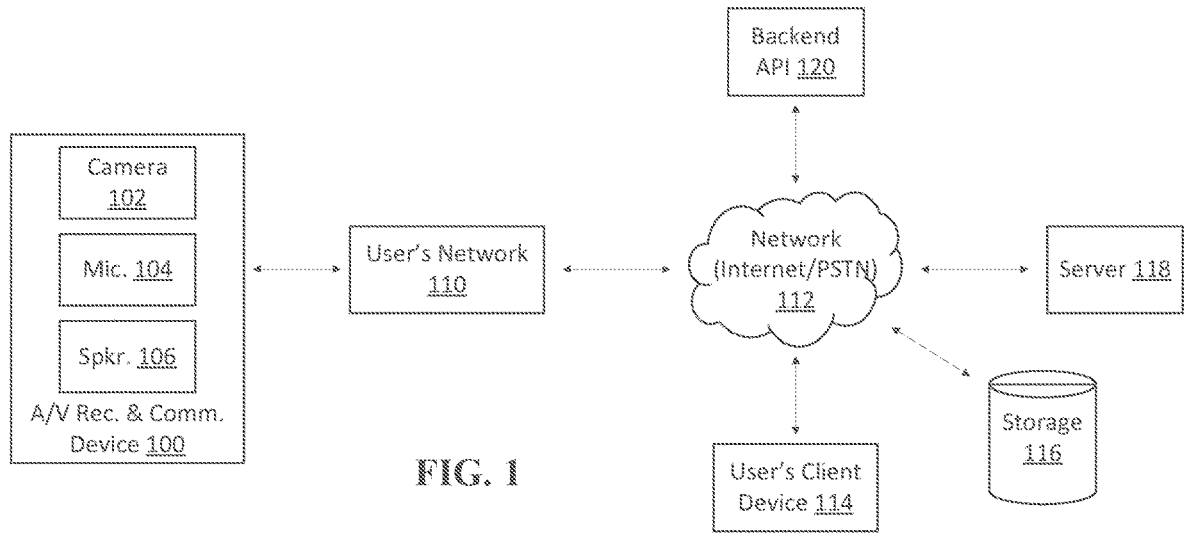
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments may include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 may include a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34b is analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
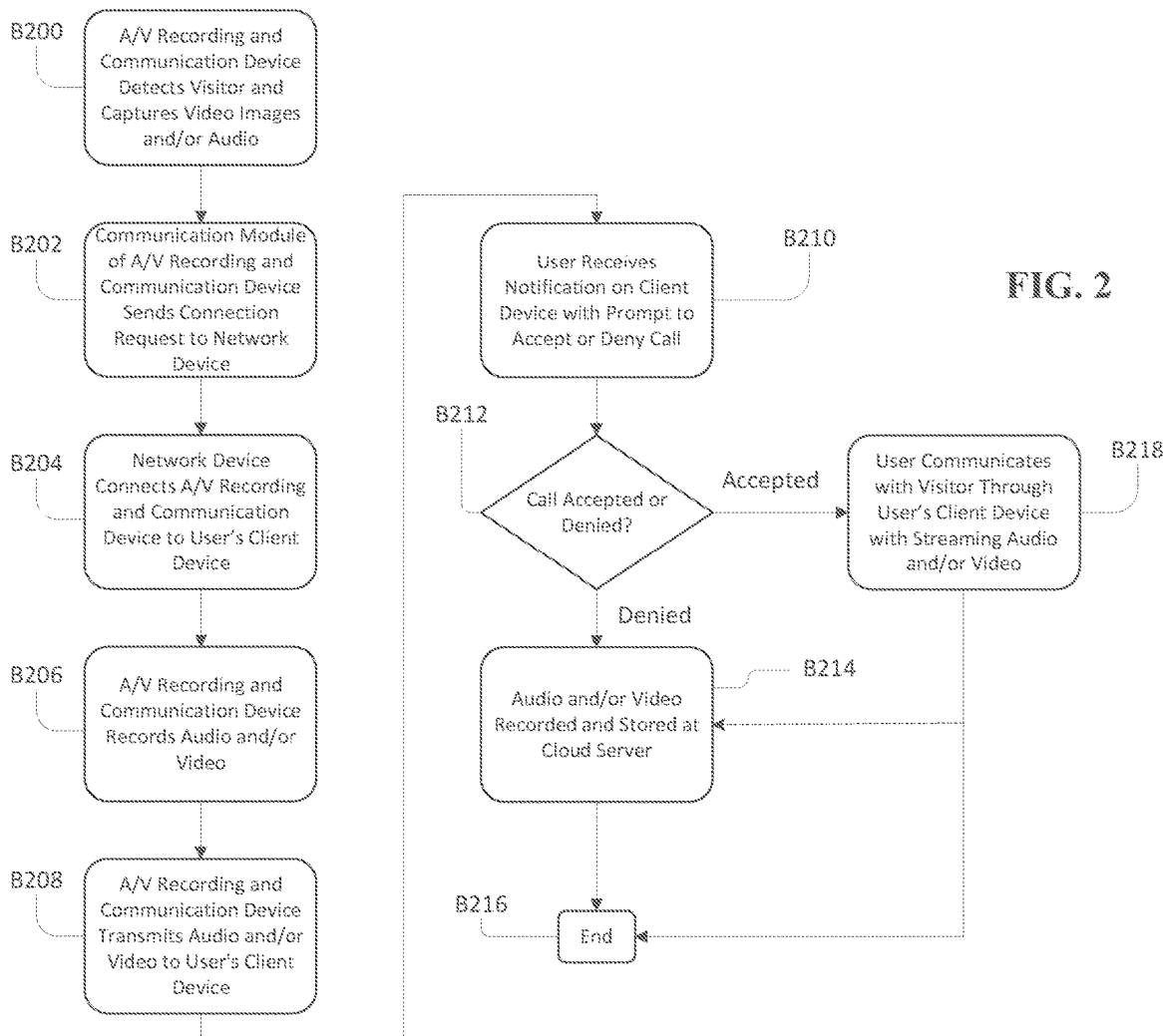
FIG. 2 is a flowchart illustrating one embodiment of a process for streaming and storing A/V content from an A/V recording and communication device according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
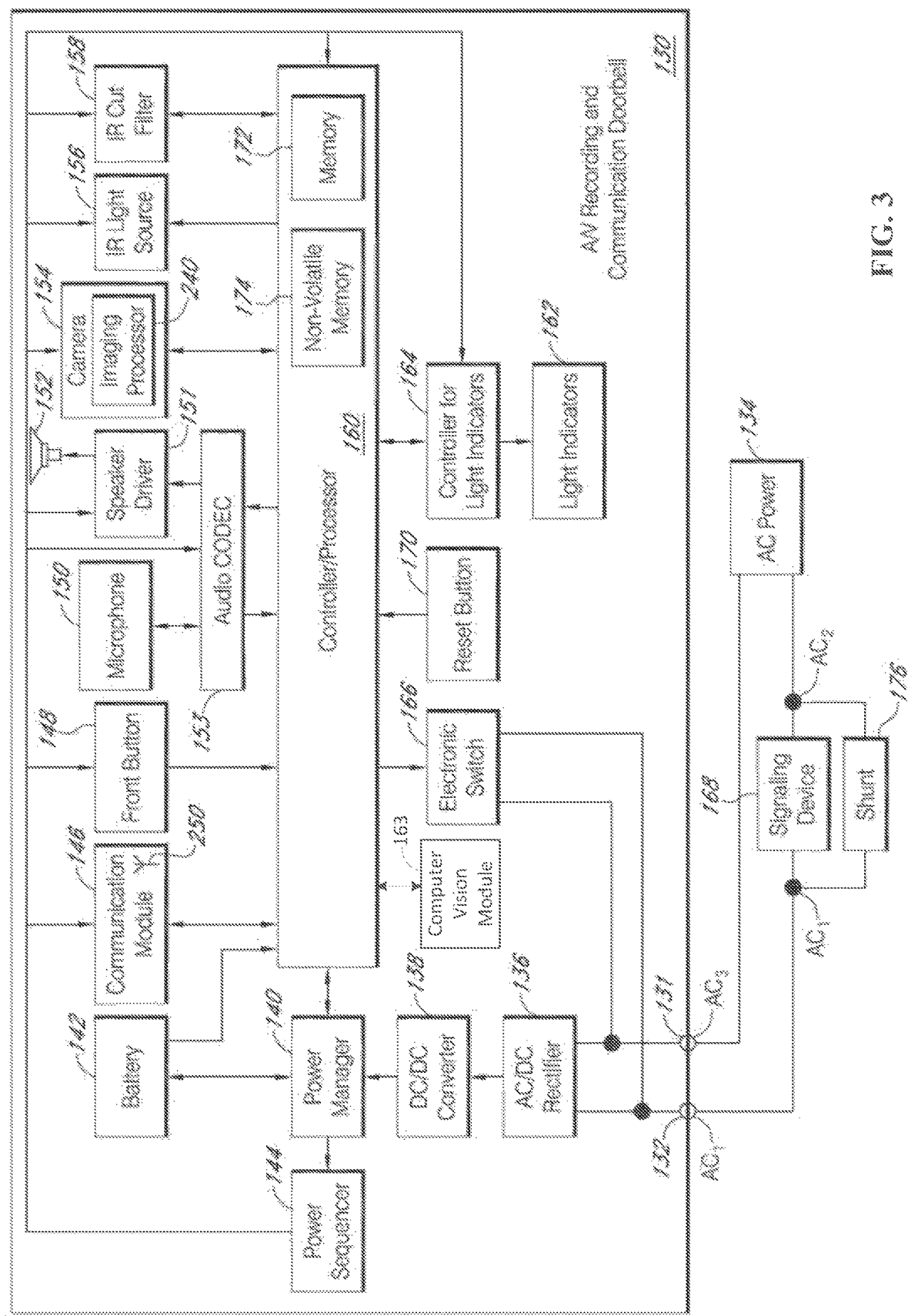
FIG. 3 is a functional block diagram illustrating an embodiment of an A/V recording and communication doorbell according to various aspects of the present disclosure.
Figure 4:
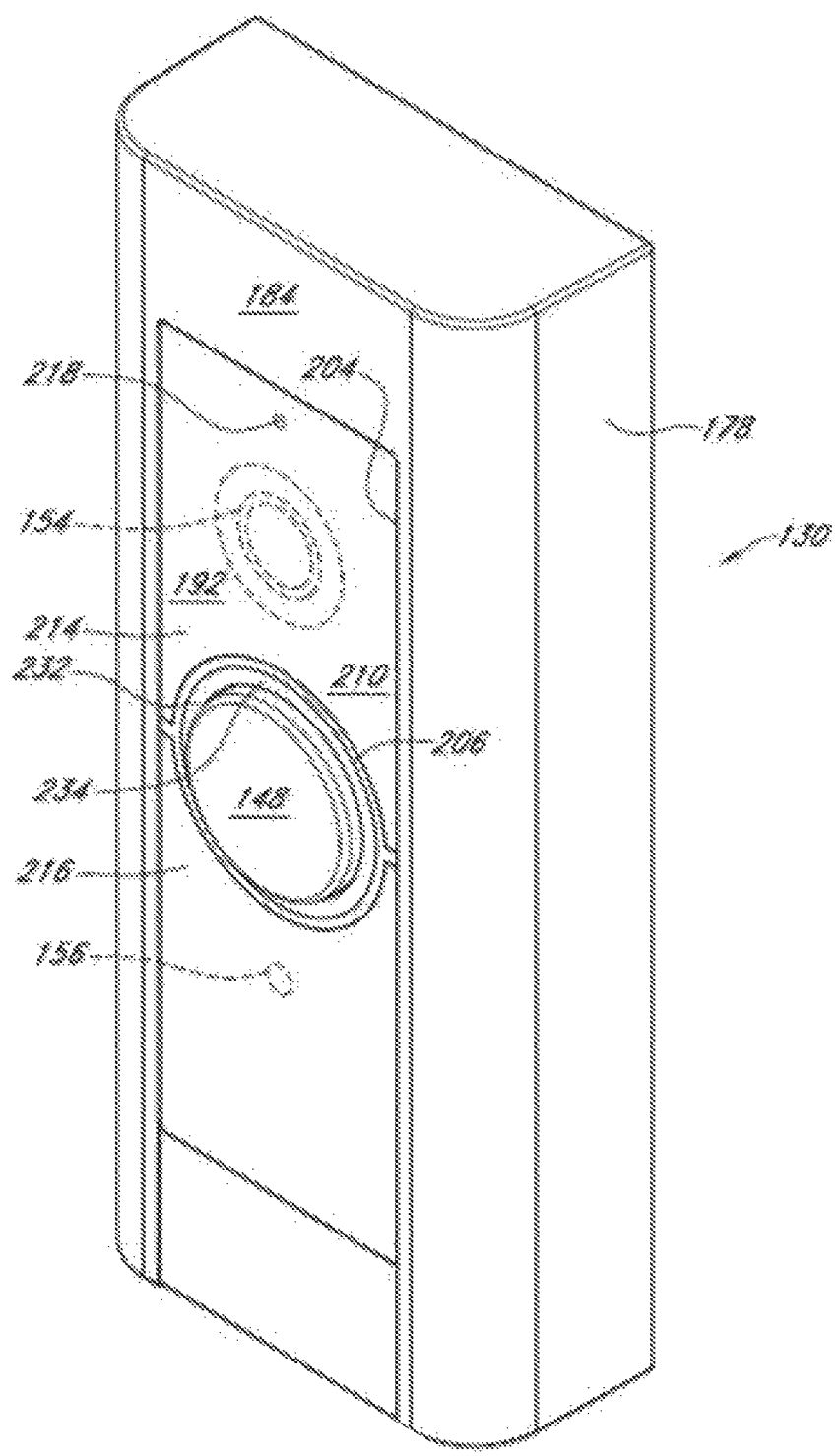
FIG. 4 is a front perspective view of an embodiment of an A/V recording and communication doorbell according to various aspects of the present disclosure.

FIGS. 3-4 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

With reference to FIG. 4, the A/V recording and communication doorbell 130 further comprises a housing 178 having an enclosure (not shown), a back plate (not shown) secured to the rear of the enclosure, and a shell 184 overlying the enclosure. A front surface of the A/V recording and communication doorbell 130 may include the button 148 (may also be referred to as front button 148), which is operatively connected to a processor (not shown). In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With further reference to FIG. 4, the shell 184 includes a central opening 204 in a front surface. The central opening 204 is sized and shaped to accommodate the shield 192. The shield 192 includes an upper portion 214 (located above and to the sides of the front button 148) and a lower portion 216 (located below and to the sides of the front button 148). The upper portion 214 of the shield 192 may be transparent or translucent so that it does not interfere with the field of view of the camera 154. As described in detail below, a microphone, which is operatively connected to the processor, is located behind the upper portion 214 of the shield 192. The upper portion 214, therefore, may include an opening 218 that facilitates the passage of sound through the shield 192 so that the microphone is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. The lower portion 216 of the shield 192, therefore, does not interfere with transmission of IR light from the IR light source, which is located behind the lower portion 216. As described in detail below, the IR light source and the IR cut filter, which are both operatively connected to the processor, facilitate "night vision" functionality of the camera 154.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 5:
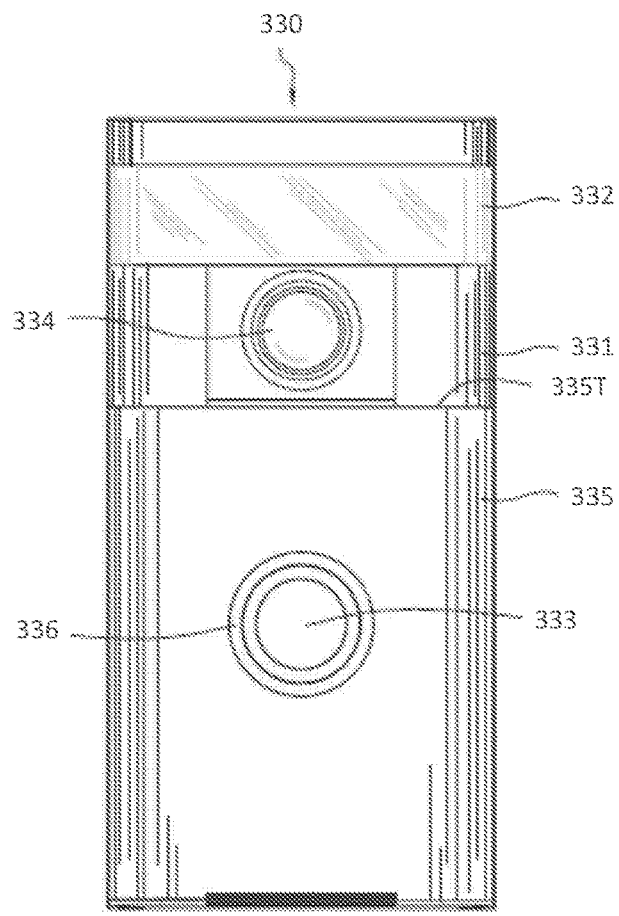
FIG. 5 is a front view of another embodiment of an A/V recording and communication doorbell according to various aspects of the present disclosure.
Figure 6:
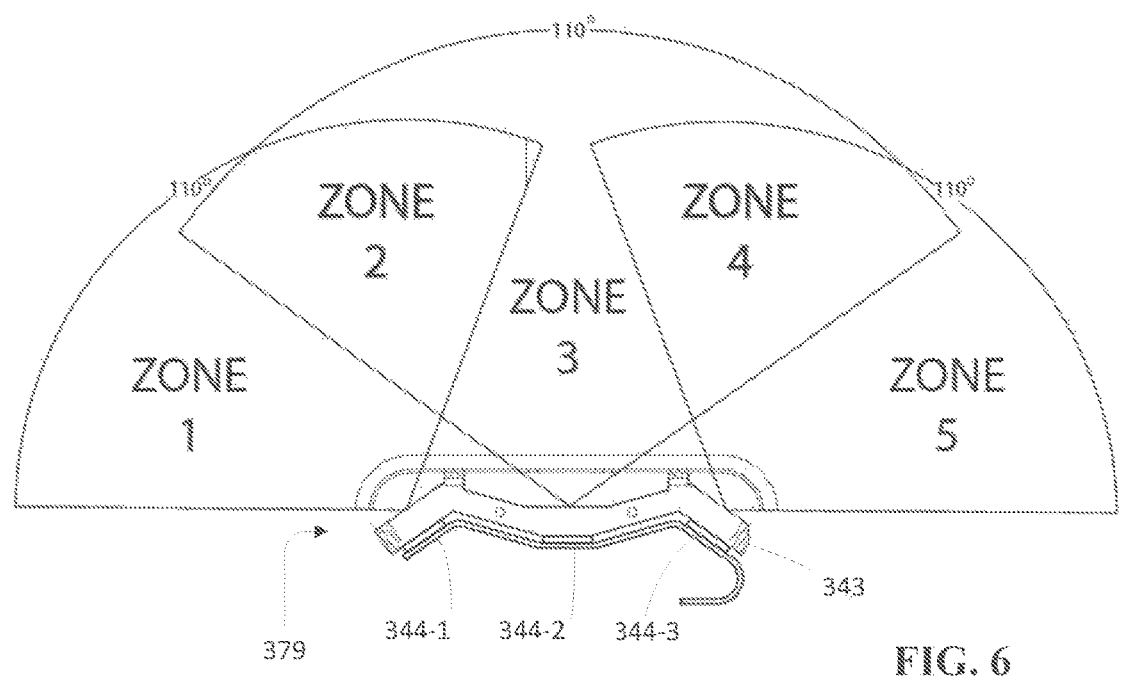
FIG. 6 is a top view of a passive infrared sensor assembly of the A/V recording and communication doorbell of FIG. 5, illustrating fields of view of passive infrared sensors of the passive infrared sensor assembly according to various aspects of the present disclosure.
Figure 7:
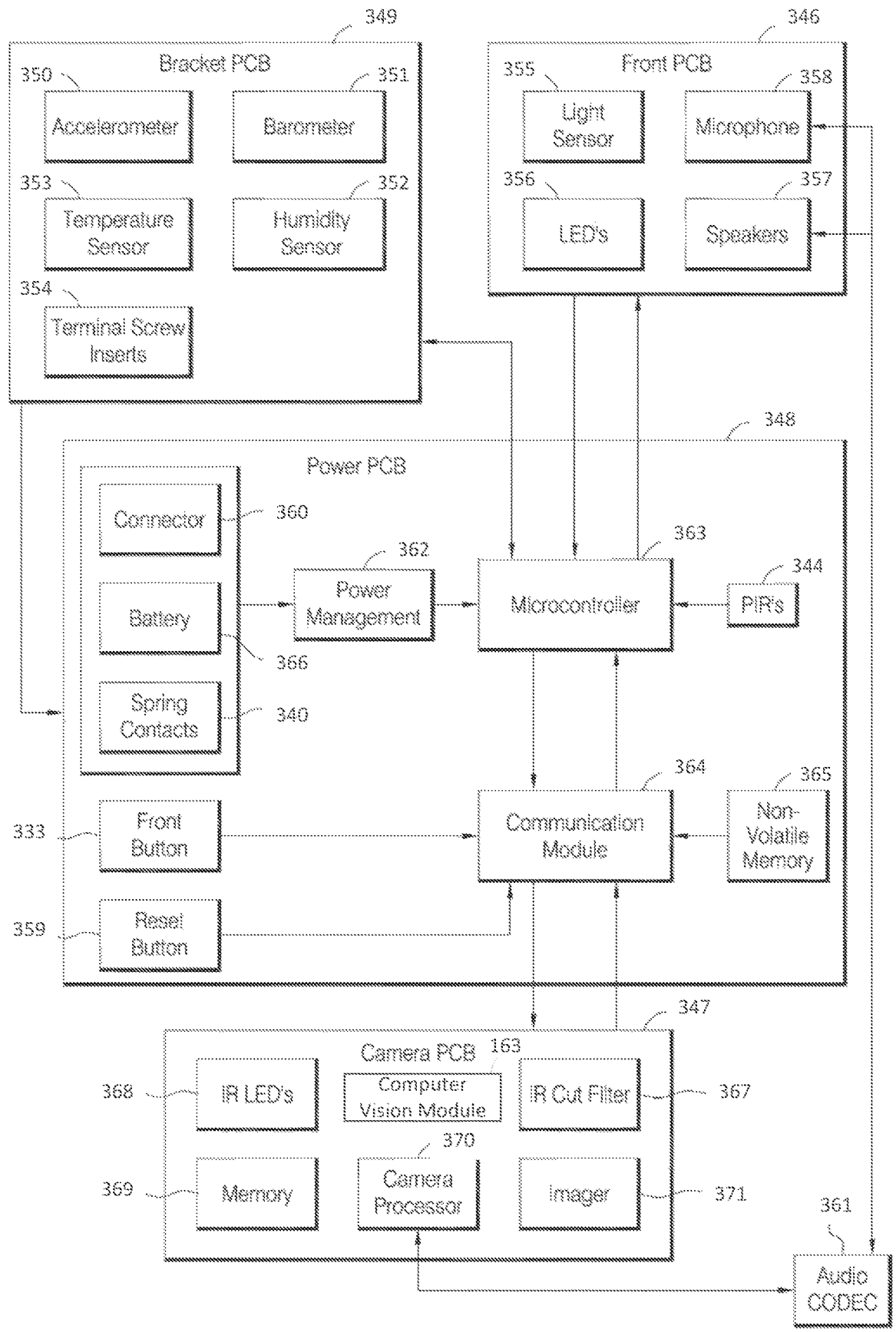
FIG. 7 is a functional block diagram of the components of the A/V recording and communication doorbell of FIG. 5.

FIGS. 5-7 illustrate another embodiment of a wireless audio/video (A/V) communication doorbell 330 according to an aspect of present embodiments. FIG. 5 is a front view of the wireless A/V communication doorbell 330. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate (not shown). The faceplate 335 protects the internal contents of the doorbell 330 and serves as an exterior front surface of the doorbell 330. The faceplate 335 may include a button 333 and a light pipe 336. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With further reference to FIG. 5, the doorbell 330 further includes an enclosure 331 that engages the faceplate 335. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

The doorbell 330 further comprises passive infrared (PIR) sensors 344-1, 344-2, 344-3 (FIG. 6, hereinafter collectively referred to as the PIR sensors 344), which are secured on or within a PIR sensor holder 343 (FIG. 6), and the assembly resides behind the lens 332. In some embodiments, the doorbell 330 may comprise three PIR sensors 344-1, 344-2, 344-3, as further described below, but in other embodiments any number of PIR sensors 344 may be provided. In some embodiments, one or more of the PIR sensors 344 may comprise a pyroelectric infrared sensor. The PIR sensors 344 may be any type of sensor capable of detecting and communicating the presence of a heat source within their field of view. Further, alternative embodiments may comprise one or more motion sensors either in place of or in addition to the PIR sensors 344.

FIG. 6 is a top view of the passive infrared sensor assembly 379 illustrating the fields of view of the passive infrared sensors 344. In the illustrated embodiment, the side faces of the passive infrared sensor holder 343 are angled at 55° facing outward from the center face, and each PIR sensor 344 has a field of view of 110°. However, these angles may be increased or decreased as desired. Zone 1 is the area that is visible only to a first one of the passive infrared sensors 344-1. Zone 2 is the area that is visible only to the first one of the PIR sensor 344-1 and a second one of the PIR sensors 344-2. Zone 3 is the area that is visible only to a second one of the PIR sensors 344-2. Zone 4 is the area that is visible only to the second one of the PIR sensors 344-2 and a third one of the passive infrared sensors 344-3. Zone 5 is the area that is visible only to the third one of the PIR sensors 344-3. In some embodiments, the doorbell 130 may be capable of determining the direction that an object is moving based upon which zones are triggered in a time sequence.

FIG. 7 is a functional block diagram of the components within or in communication with the doorbell 330, according to an aspect of the present embodiments. The bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. The bracket PCB 349 may be located outside the housing of the doorbell 330 so as to reduce interference from heat, pressure, moisture, and/or other stimuli generated by the internal components of the doorbell 330.

With further reference to FIG. 7, the bracket PCB 349 may further comprise terminal screw inserts 354, which may be configured to receive the terminal screws and transmit power to the electrical contacts on the mounting bracket. The bracket PCB 349 may be electrically and/or mechanically coupled to the power PCB 348 through the terminal screws, the terminal screw inserts 354, the spring contacts 340, and the electrical contacts. The terminal screws may receive electrical wires located at the surface to which the doorbell 330 is mounted, such as the wall of a building, so that the doorbell can receive electrical power from the building's electrical system. Upon the terminal screws being secured within the terminal screw inserts 354, power may be transferred to the bracket PCB 349, and to all of the components associated therewith, including the electrical contacts. The electrical contacts may transfer electrical power to the power PCB 348 by mating with the spring contacts 340.

With further reference to FIG. 7, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 5). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114 (FIG. 1). When the user speaks, after being transferred through the network 112, digital audio data is decompressed by audio CODEC 361 and emitted to the visitor via the speakers 357.

With further reference to FIG. 7, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 7, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 7, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 7, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 3, embodiments of the present AN recording and communication doorbell 130 may include a computer vision module 163. The computer vision module 163 may include any of the components (e.g., hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

One aspect of the present embodiments includes the realization that, historically, doorbell buttons, including doorbell buttons of video doorbells, have primarily been used for the purpose of triggering a notification to a user/owner of the doorbell (e.g., the resident of a property where the doorbell is installed) that a person is present at the property. However, as video doorbells have become more integrated with home automation and security systems, video doorbells, other than the present embodiments, have not leveraged the functionality of video doorbells to provide additional functionality to the doorbell button beyond its traditional use (e.g., triggering a visual or audible notification of the presence of a person).

The present embodiments solve this problem by leveraging the functionality of the doorbell button of video doorbells to interact with home automation devices, home security systems, and/or to establish two-way communication between the video doorbell and a security monitoring service. For example, in some embodiments, in response to an input to the doorbell button, a person may provide a command input to the video doorbell (e.g., an audible input, a gesture input, etc.) for unlocking/locking a door, arming/disarming a security system, and/or initiating communication with a security monitoring service for requesting access to a property where the video doorbell is installed. As a result, the user/owner of the video doorbell and/or guests of the property where the video doorbell is installed, may have an additional platform (e.g., directly through the video doorbell based on an input to the doorbell button) for communicating with a security system, accessing the property, and/or contacting a security monitoring service, for example. Ultimately, because of this increased functionality, the user/owner of the video doorbell may be more likely to arm their security system and/or lock their doors, thereby contributing the security of the property where the video doorbell is located.

For example, in some of the present embodiments, an audio/video (A/V) recording and communication doorbell including a processor, a button, a communication module, a camera, and a microphone, receives, by the button, an input and generates, by the processor in response to the input, input data; determines, by the processor based on the input data, whether the input is received for a threshold period of time; upon determining the input is received for the threshold period of time, activates, by the processor, a command input mode; in response to entering the command input mode, receives, by at least one of the microphone and the camera, a command input; in response to receiving the command input, analyzes, by the processor, the command input to determine an action; and based on the determination, executes, by the processor using the communication module, the action.

Figure 8:
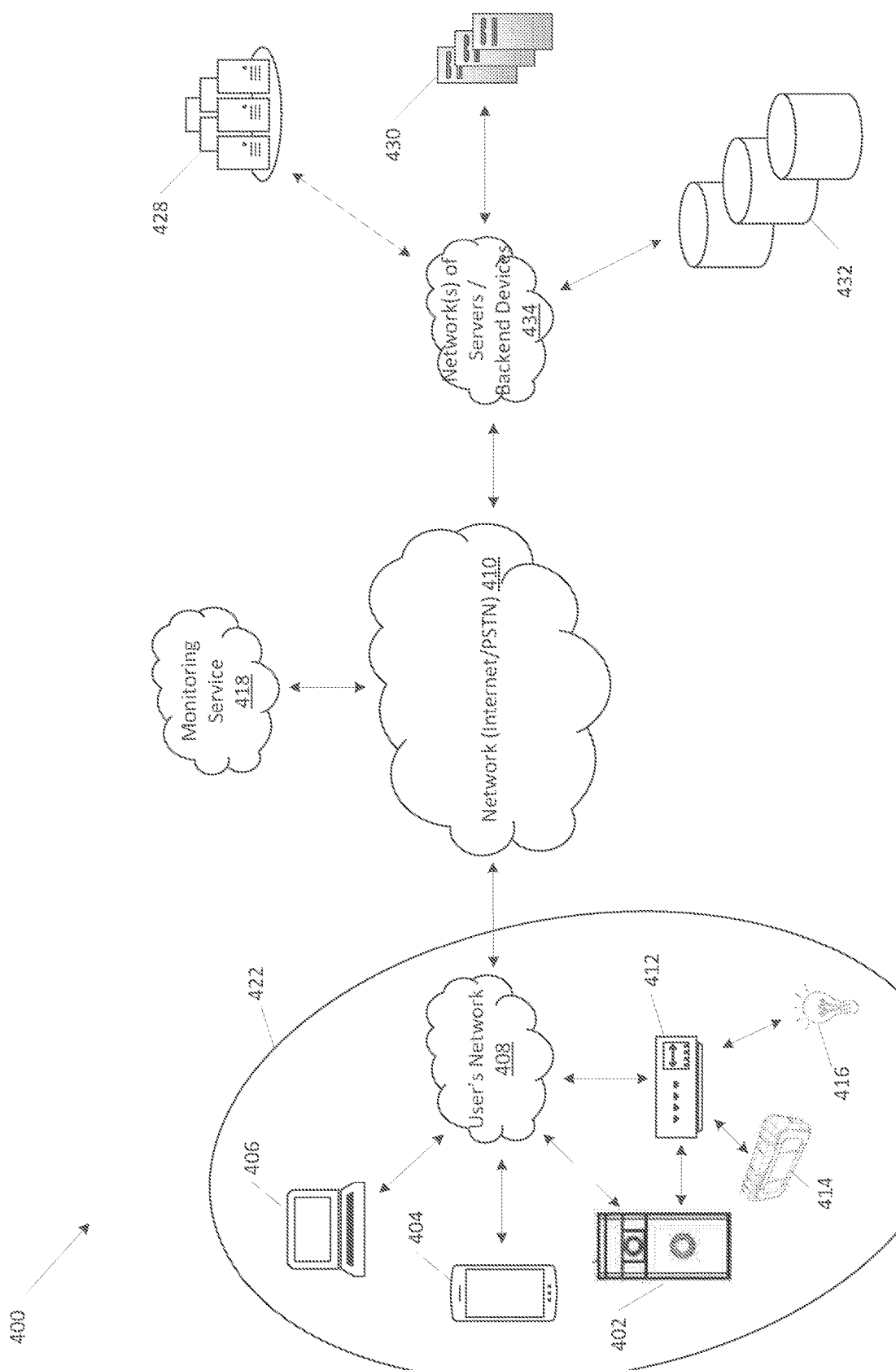
FIG. 8 is a functional block diagram illustrating a system for communicating in a network according to various aspects of the present disclosure.

FIG. 8 is a functional block diagram illustrating a system 400 for communicating in a network according to various aspects of the present disclosure. The system 400 may include one or more A/V recording and communication doorbells 402 configured to access a user's network 408 to connect to a network (Internet/PSTN) 410. The one or more A/V recording and communication doorbells 402 may include any or all of the components and/or functionality of the A/V recording and communication device 100 (FIGS. 1-2), the A/V recording and communication doorbell 130 (FIGS. 3-4), and/or the A/V recording and communication doorbell 330 (FIGS. 5-7).

The user's network 408 may include any or all of the components and/or functionality of the user's network 110 described herein. The system 400 may also include one or more client devices 404, 406, which in various embodiments may be configured to be in network communication and/or associated with the A/V recording and communication doorbell 402. The client devices 404, 406 may comprise, for example, a mobile phone such as a smartphone, or a computing device such as a tablet computer, a laptop computer, a desktop computer, etc. The client devices 404, 406 may include any or all of the components and/or functionality of the client device 114 (FIG. 1) and/or the client device 800 (FIG. 17) described herein. In some embodiments, one or more of the client devices 404, 406 may not be associated with the A/V recording and communication doorbell 402.

The system 400 may further include a smart-home hub device 412 (which may alternatively be referred to herein as the hub device 412) connected to the user's network 408. The smart-home hub device 412 (also known as a home automation hub, gateway device, etc.), may comprise any device that facilitates communication with and control of the sensors 414, automation devices 416, the one or more A/V recording and communication doorbells 402, and/or other A/V recording and communication devices (not shown, e.g., security cameras, floodlight cameras, spotlight cameras, etc.). For example, the smart-home hub device 412 may be a component of a home automation system installed at a property. As illustrated in FIG. 8, the A/V recording and communication doorbell 402 may communicate with the smart-home hub device 412 directly and/or indirectly via the user's network 408. As also illustrated in FIG. 8, the sensors 414 and the automation devices 416 may communicate with the smart-home hub device 412 directly and/or indirectly via the user's network 408.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 412, the sensors 414, the automation devices 416, the A/V recording and communication doorbells 402, etc.), when remotely monitored and controlled via the network (Internet/PSTN) 410, may be considered to be components of the Internet of Things. Smart home systems may include switches and/or sensors (e.g., the sensors 416) connected to a central hub such as the smart-home hub device 412, sometimes called a gateway, from which the system may be controlled with a user interface. The user interface may include any or all of a wall-mounted terminal, software installed on the client devices 404, 406 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 414 may include, for example, at least one of a door sensor, a window sensor, a contact sensor, a tilt sensor, a temperature sensor, a carbon monoxide sensor, a smoke detector, a light sensor, a glass break sensor, a motion sensor, a thermostat, and/or other sensors that may provide the user/owner of the security system 422 a notification of a security event at his or her property.

The one or more automation devices 416 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), and/or other automation devices.

As described herein, in some of the present embodiments, some or all of the user's network 408, the client devices 404, 406, the A/V recording and communication doorbell 402, the smart-home hub device 412, the sensors 414, and the automation devices 416 may be referred to as a security system 422, which may be installed at a property or premises.

With further reference to FIG. 8, the system 400 may also include various backend devices such as (but not limited to) storage devices 432, backend servers 430, and backend APIs 428 that may be in network communication with the A/V recording and communication doorbell 402, the hub device 412, the client devices 404, 406, the sensors 414, and/or the automation devices 416. In some embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

With further reference to FIG. 8, the system 400 may also include a security monitoring service 418. The security monitoring service 418 may be operated by the same company that manufactures, sells, and/or distributes the A/V recording and communication doorbell 402, the hub device 412, the sensors 414, and/or the automation devices 416. In other embodiments, the security monitoring service 418 may be operated by a third-party company (e.g., a different company than the one that manufactured, sold, and/or distributed the A/V recording and communication doorbell 402, the hub device 412, the sensors 414, and/or the automation devices 416). In any of the present embodiments, the security monitoring service 418 may have control of at least some of the features and components of the security system 422 (e.g., the security monitoring service 418 may be able to arm and/or disarm the security system 422, lock and/or unlock doors, activate and/or deactivate one or more of the sensors 414 and/or the automation devices 416, etc.). For example, in some embodiments, two-way audio and/or one-way or two-way video communication may be established between the A/V recording and communication doorbell 402 and the security monitoring service 418 in response to a person pressing (or providing a touch input to) the button 445 (FIG. 9) of the A/V recording and communication doorbell 402 for a threshold period of time. In response, the security monitoring service 418 may, based on the identity of the person (e.g., determined using biometric data 486 (FIG. 9)), unlock the front door of the premises where the A/V recording and communication doorbell 402 is located and/or disarm the security system 422 to enable the person access to the property. In other examples, the security monitoring service 418 may ask the person for a code, a password, or a passphrase, and/or ask the person to respond to a number of security questions prior to executing an action 484 and/or an arming action 494 (e.g., unlocking the door, arming the security system, etc., FIG. 9).

Figure 9:
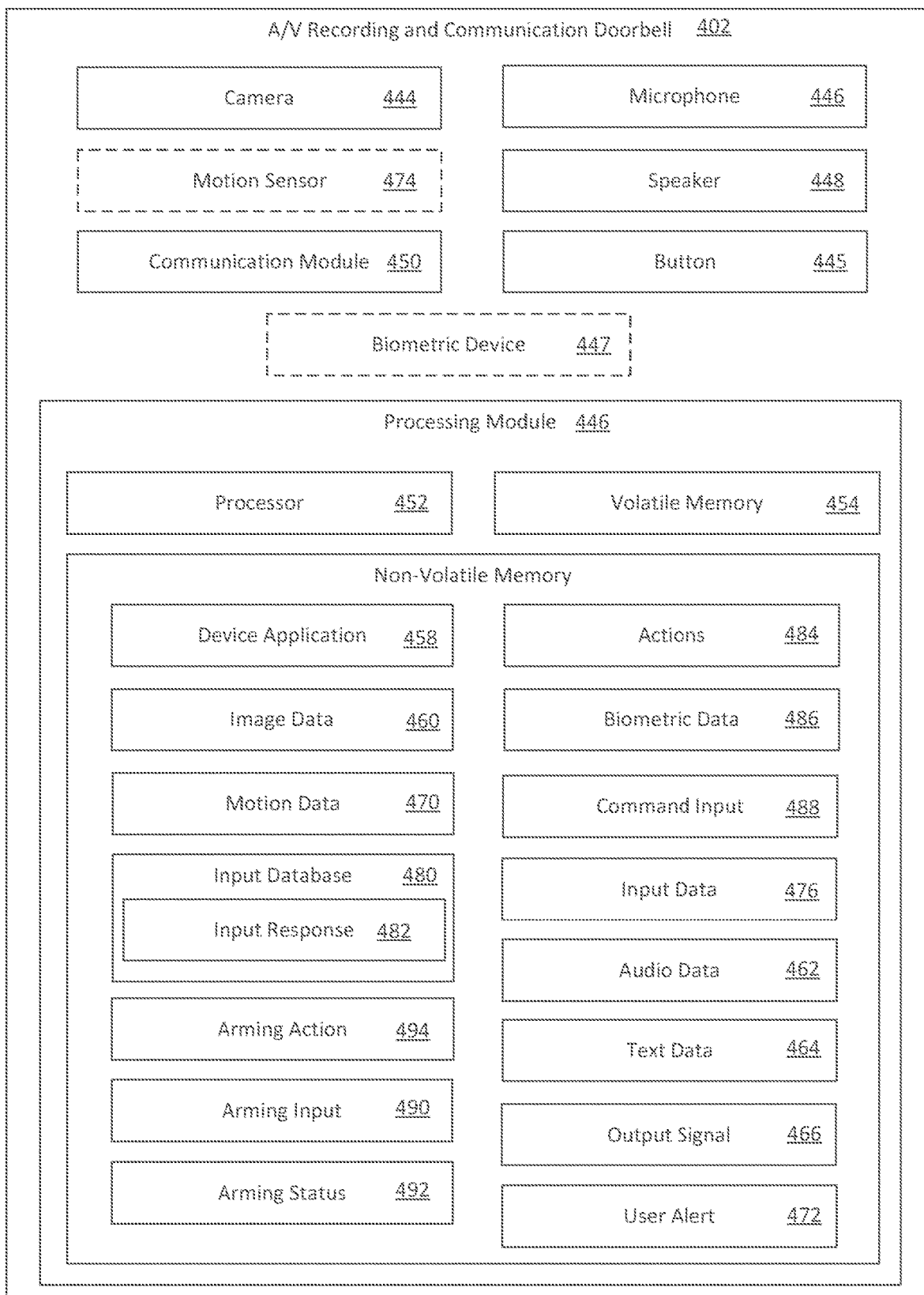
FIG. 9 is a functional block diagram illustrating one embodiment of an A/V recording and communication doorbell according to various aspects of the present disclosure.

FIG. 9 is a functional block diagram illustrating an embodiment of the A/V recording and communication doorbell 402 according to various aspects of the present disclosure. The A/V recording and communication doorbell 402 may comprise a processing module 446 that is operatively connected to a camera 444, a microphone 446, a speaker 448, a motion sensor 474, a button 445, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, input data 476 using the button 445, and/or motion data 470 using the camera 444 and/or the motion sensor 474. In some embodiments, the device application 458 may also configure the processor 452 to generate text data 464 describing the image data 460, the audio data 462, and/or the input data 476, such as in the form of metadata, for example. In some of the present embodiments, the device application 458 may also configure the processor 452 to generate biometric data 486 (e.g., facial recognition using the camera 444 and/or other biometric data using one or more biometric devices 447). The device application 458 may also configure the processor 452 to compare the input data 476 to the input database 480 to determine an input response 482 (e.g., whether to execute an automatic action or activate a command input mode for receiving a command input 488).

In addition, the device application 458 may configure the processor 452 to transmit the image data 460, the audio data 462, the motion data 470, the input data 476, the biometric data 486, the text data 464, the user alert 472, the arming actions 494, and/or the actions 484 to the hub device 412 and/or the backend server 430 using the communication module 450. In various embodiments, the device application 458 may also configure the processor 452 to generate and transmit an output signal 466 that may include the image data 460, the audio data 462, the text data 464, the input data 476, the biometric data 486, the arming actions 494, the actions 484, and/or the motion data 470. In some of the present embodiments, the output signal 466 may be transmitted to the backend server(s) 430 using the communication module 450, and the backend server(s) 430 may transmit (or forward) the output signal 466 to the client devices 404, 406 and/or the hub device 412. In other embodiments, the output signal 466 may be transmitted directly to the client devices 404, 406 and/or the hub device 412.

In further reference to FIG. 9, the image data 460 may comprise image sensor data such as (but not limited to) exposure values and data regarding pixel values for a particular sized grid. The image data 460 may include still images, live video, and/or pre-recorded video. The image data 460 may be recorded by the camera 444 in a field of view of the camera 444.

In further reference to FIG. 9, the motion data 470 may comprise motion sensor data generated in response to motion events. For example, in embodiments using a motion sensor 474, the motion data 470 may include an amount or level of a data type generated by the motion sensor 474. In some of the present embodiments, such as those where the A/V recording and communication doorbell 402 is similar to that of the A/V recording and communication doorbell 130 of FIGS. 3-4, the motion data 470 may be generated by the camera 444. In such embodiments, the A/V recording and communication doorbell 402 may not have a motion sensor 474 (as illustrated by the dashed lines around the motion sensor 474 in FIG. 9).

The input data 476 may include that data generated in response to an input to the button 445. The button 445 (which may include similar design and functionality to that of the front button 148 (FIG. 3) and/or the front button 333 (FIG. 7)), may receive an input (e.g., a press, a touch, a series of touches and/or presses, etc.) and may generate the input data 476 in response that is indicative of the type of input. As a result, the input data 476 may be analyzed by the processor 452 to determine the proper action 484 to take, such as, without limitation, to arm the security system 422 (e.g., by transmitting the arming action 494 to the hub device 412), to lock the front door (e.g., by transmitting a lock signal to a locking automation device of the automation devices 416), and/or to initiate a communication with the security monitoring service 418.

The biometric data 486 may be generated by the A/V recording and communication doorbell 402 using biometric capabilities. For example, the biometric capabilities may include facial recognition and/or facial detection (as described above), fingerprint recognition, eye recognition (iris recognition, retinal scanning, etc.), voice recognition, and/or other biometric capabilities depending on the embodiment. The biometric capabilities may be used to determine the identity of persons who interact with and/or are in the field of view of the A/V recording and communication doorbell 402. In some of the present embodiments, such as where the biometric data 486 includes fingerprint recognition, the A/V recording and communication doorbell 402 may include one or more biometric devices 447. For example, the one or more biometric device 447 of the A/V recording and communication doorbell 402 may include a fingerprint scanner/reader for performing fingerprint recognition and/or a retinal scanner for performing retinal scans. In some of the present embodiments, the one or more biometric devices 447 may be incorporated into the button 445. For example, the button 445 may include a fingerprint scanner, such that when a person touches or presses the button 445, the biometric data 486 from the fingerprint in addition to the input data 476 are generated by the A/V recording and communication doorbell 402. In other embodiments, the camera 444 may be used for iris recognition and/or facial recognition and the microphone 446 may be used for voice recognition. In such embodiments, the camera 444 and/or the microphone 446 may be referred to as the biometric device 447.

The command input 488 may include a verbal and/or visual (e.g., gesture) command by a person in the field of view of the A/V recording and communication doorbell 402. The command input 488 may be received by the camera 444 (e.g., for visual command inputs 488) and/or the microphone 446 (e.g., for audible command inputs 488). For example, the command input 488 may include a spoken security word (password) or words (passphrase), a code, or another verbal input. As another example, the command input 488 may include a gesture, such as a hand and/or body gesture, which may be indicative of the desired action (e.g., opening hands indicates unlocking a door, clapping indicates sounding an alarm, holding a certain number of fingers up indicates a digit of a code, etc.). In some of the present embodiments, in response to the command input 488, the processor 452 may analyze the command input 488 to determine the action(s) 484 to take (e.g., to lock/unlock a door, turn on/off a lighting automation system, contact the security monitoring service 418, etc.).

The command input 488 may be received in response to the A/V recording and communication doorbell 402 entering a command input mode. In some of the present embodiments, the A/V recording and communication doorbell 402 may generate a request for the command input 488 once in the command input mode. For example, the speaker 448 may emit an audible request for the command input 488 and/or a light display (e.g., the light pipe 336 (FIG. 5), the IR LED's 368 (FIG. 5), and/or other lighting devices (not shown) of the A/V recording and communication doorbell 402) may provide a visual request for the command input 488 (e.g., a visual indication that the doorbell 402 is in the command input mode). The command input mode may be activated based on the input data 476. For example, the input data 476 may be analyzed to determine if the A/V recording and communication doorbell 402 should be placed into the command input mode (e.g., if the input data 476 indicates that an input to the button 445 was received for a threshold period of time).

In some of the present embodiments, the action(s) 484 for an identical command input 488 may be different dependent on the current status of one or more of the sensors 414 and/or the automation devices 416. For example, a person making a first may trigger the action 484 to lock the door when the door is unlocked and may trigger the action 484 to unlock the door when the door is locked.

With further reference to FIG. 9, the arming input 490 may include a verbal and/or visual (e.g., gesture) command by a person in the field of view of the A/V recording and communication doorbell 402. The arming input 490 may be received by the camera 444 (e.g., for visual arming inputs 490) and/or the microphone 446 (e.g., for audible arming inputs 490). For example, the arming input 490 may include a spoken security word or words, a code, or another verbal input. As another example, the arming input 490 may include a gesture, such as a hand and/or body gesture, which may be indicative of the desired arming action 494 (e.g., opening hands indicates a request to update the arming status 492 of the security system 422 to an armed away mode, clapping indicates sounding an alarm of the security system 422, holding a certain number of fingers up indicates a digit of a security code for activating/deactivating the security system 422, etc.). In some of the present embodiments, in response to the arming input 490, the processor 452 may analyze the arming input 490 to determine the arming action(s) 494 to take (e.g., to activate an armed stay mode, to activate an armed away mode, to establish a two-way communication between the A/V recording and communication doorbell and the security monitoring service 418, etc.).

The arming input 490 may be received in response to the A/V recording and communication doorbell 402 entering an arming input mode. In some of the present embodiments, the A/V recording and communication doorbell 402 may generate a request for the arming input 490 once in the arming input mode. For example, the speaker 448 may emit an audible request for the arming input 490 and/or a light display (e.g., the light pipe 336 (FIG. 5), the IR LED's 368 (FIG. 5), and/or other lighting devices (not shown) of the A/V recording and communication doorbell 402) may provide a visual request for the arming input 490 (e.g., a visual indication that the doorbell 402 is in the arming input mode). The arming input mode may be activated based on the input data 476. For example, the input data 476 may be analyzed to determine if the A/V recording and communication doorbell 402 should be placed into the arming input mode (e.g., if the input data 476 indicates that an input to the button 445 was received for a threshold period of time).

In some of the present embodiments, the arming action(s) 494 for an identical arming input 490 may be different dependent on the current arming status 492 of the security system. For example, a person speaking the security code "9652" may trigger the arming action 494 of arming the security system 422 when the security system 422 is disarmed and may trigger the arming action 494 of disarming the security system 422 when the security system 422 is armed.

In some of the present embodiments, based on the input data 476 generated by the button 445 in response to an input to the button 445, the A/V recording and communication doorbell 402 may enter either the command input mode, the arming input mode, or may execute an automatic action (e.g., execute one of the actions 484 and/or arming actions 494 that do not require a command input 488 and/or an arming input 490). In such embodiments, similar visual and/or audible inputs may trigger different actions 484 and/or arming actions 494 dependent on whether the A/V recording and communication doorbell 402 is in the command input mode or the arming input mode. For example, a raised first may trigger the A/V recording and communication doorbell 402 to execute the action 484 of locking the front door in the command input mode, but may trigger the A/V recording and communication doorbell 402 to execute the arming action 494 of updating the arming status 492 of the security system 422 to an armed away mode in the arming input mode. In other embodiments, the arming input mode and the command input mode may be the same, such that each possible audible and/or visual command input 488 and each possible audible and/or visual arming input 490 are unique to each other command input 488 and arming input 490.

With further reference to FIG. 9, a user alert 472 may be generated by the processor 452 and transmitted, using the communication module 450, to the client devices 404, 406 and/or the hub device 412 (in some embodiments, via the backend server 430). In embodiments where the user alert 472 is transmitted to the hub device 412, the hub device 412 may analyze the user alert 472 and update/edit the user alert 472 (e.g., to add additional information related to the status of the security system 422) and transmit the user alert 472 to the client devices 404, 406. In some of the present embodiments, the user alert 472 may be generated in response to improper command inputs 488 and/or arming inputs 490. For example, a person may provide an input to the button 445, and the A/V recording and communication doorbell 402 may enter the command input mode in response. Once in the command input mode, the person may provide a command input 488 (e.g., a spoken security code, a body gesture, etc.) and the command input 488 may not match any of the available command inputs 488 for executing one or more of the actions 484. As a result, the user alert 472 may be generated to notify the user of the client devices 404, 406 that an attempt to provide the command input 488 was attempted and has failed. As another example, a person may provide an input to the button 445, and the A/V recording and communication doorbell 402 may enter an arming input mode in response. Once in the arming input mode, the person may provide an arming input 490 for arming the security system 422 (e.g., a spoken security code, a body gesture, etc.) and the arming input 490 of the person may not match any of the necessary arming inputs 490 for executing an arming action 494. As a result, the user alert 472 may be generated to notify the user of the client devices 404, 406 that an attempt to provide the arming input 490 was attempted and has failed, and the A/V recording and communication doorbell 402 and/or one or more of the sensors 414, the automation devices 416, and/or the hub device 412 may sound an alarm.

In some of the present embodiments, the user alert 472 may be generated in response to the A/V recording and communication doorbell 402 detecting motion in the field of view of the A/V recording and communication doorbell 402 (e.g., in the field of view of the camera 444 and/or the motion sensor 474), which may be referred to herein as a motion event. In such embodiments, the user alert 472 may be updated, similar to that described above, in response to proper and/or improper attempts of a person to provide the command input 488 and/or the arming input 490 during the motion event. In some of the present embodiments, the user alert 472 may be updated dynamically, such as in response to each attempt at a command input 488 and/or an arming input 490 during the motion event. In any embodiment, the user alert 472 may be updated at the completion of the recording of the motion event by the A/V recording and communication doorbell 402, such that when reviewing the user alert 472, the user of the client devices 404, 406 may be able to view the image data 460 captured during the motion event by the camera 444 in addition to the information related to the successful and/or unsuccessful attempts at providing the command input 488 and/or the arming input 490.

Figure 10:
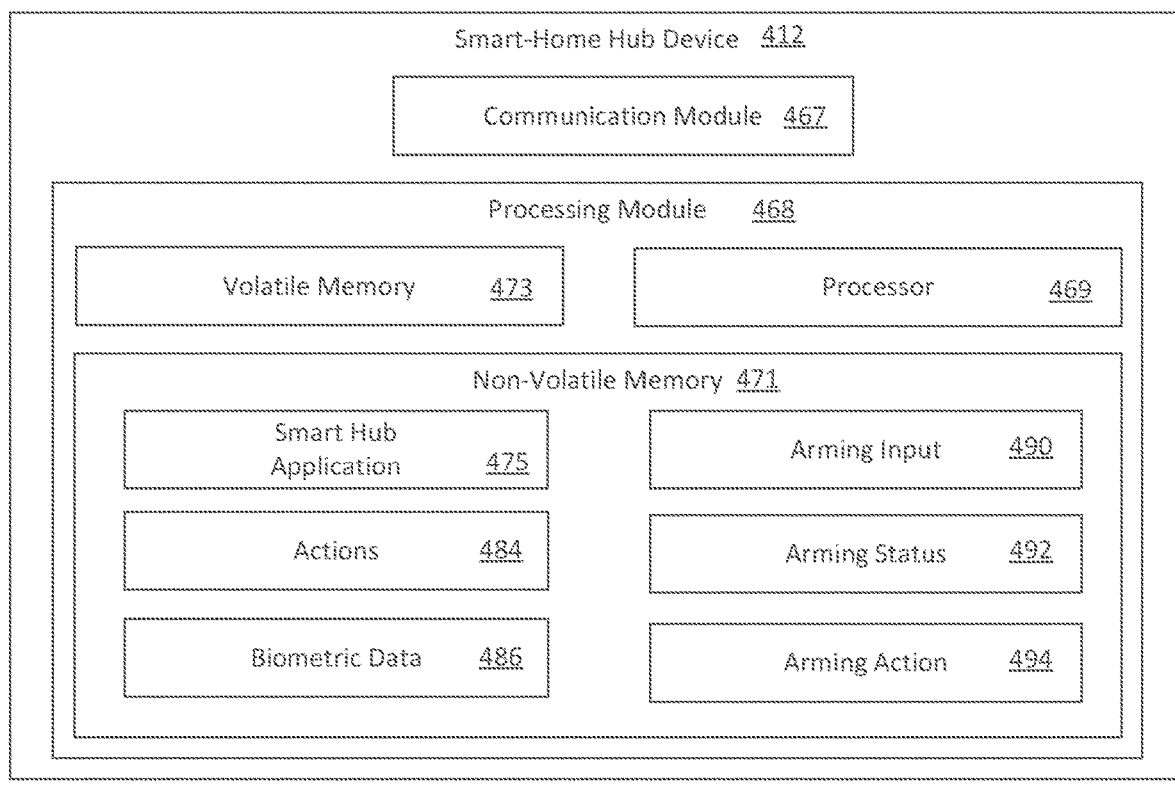
FIG. 10 is a functional block diagram illustrating one embodiment of a smart-home hub device according to various aspects of the present disclosure.

FIG. 10 is a functional block diagram illustrating an embodiment of the smart-home hub device 412 (alternatively referred to herein as the hub device 412) according to various aspects of the present disclosure. The hub device 412 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 410 for enabling remote control of the hub device), and/or another similar device. The hub device 412 may comprise a processing module 468 that is operatively connected to a communication module 467. In some embodiments, the hub device 412 may comprise one or more of a camera (not shown), a microphone (not shown), and a speaker (not shown). The processing module 468 may comprise a processor 469, volatile memory 473, and non-volatile memory 471 that includes a smart-home hub application 475. In various embodiments, the smart-home hub application 475 may configure the processor 469 to receive sensor data from the sensors 414 and/or the automation devices 416. For example, the sensor data may include a current state (e.g., opened/closed for door and window sensors, motion detected for motion sensors, living room lights on/off for a lighting automation system, etc.) of each of the sensors 414 and/or the automation devices 416.

With further reference to FIG. 10, the smart-home hub application 475 may configure the processor 469 to receive the arming actions 494, the actions 484, the audio data 462, the text data 464, the image data 460, the motion data 470, the biometric data 486, and/or the user alert 472 from the A/V recording and communication doorbell 402 (in some embodiments, via the backend server 430) using the communication module 467. For example, the hub device 412 may receive the arming actions 494 and, in response, update the arming status 492 of the security system 422. As another example, the hub device 412 may receive the action 484 and activate and/or deactivate one or more of the sensors 414 and/or the automation device 416.

In some of the present embodiments, the smart-home hub application 475 may configure the processor 469 to execute the arming action 494 in response to receiving the arming action 494 from the A/V recording and communication doorbell 402 (in some embodiments, via the backend server 430). Executing the arming action 494 may include arming/disarming the security system 422 controlled by the hub device 412. For example, the arming actions 494 may include a disarmed mode (state), an armed stay mode, an armed away mode, an armed vacation mode, or another armed mode for the security system 422. In some embodiments, the smart-home hub application 475 may configure to the processor 469 to transmit the arming status 492 of the security system 422 to the A/V recording and communication doorbell 402 and/or the client devices 404, 406 (in some embodiments, via the backend server 430). For example, the information representative of the arming action 494 may include the arming status of the first security system 422 (e.g., armed away, armed stay, disarmed, etc.).

The arming actions 494, as described herein, may include an armed stay mode, an armed away mode, an armed vacation mode, a disarmed mode, and/or other modes, such as a custom mode of the user. In the armed stay mode, the sensors 414 inside the property (e.g., motion sensors) may be disarmed while the sensors 414 and/or the A/V recording and communication doorbell 402 (or other A/V recording and communication devices) outside and along the perimeter of the property (e.g., door sensors, window sensors, video doorbells, security cameras etc.) may be armed. In addition, during the armed stay mode, at least one of the automation devices 416 (e.g., an outdoor lighting automation system) may be activated between certain hours, such as 6:00 p.m. and 4:00 a.m. In an armed away mode, the sensors 414 inside the property (e.g., the motion sensors), the sensors 414 outside and along the perimeter of the property (e.g., door sensors, window sensors, etc.), and/or the A/V recording and communication doorbell 402 (and/or other A/V recording and communication devices, e.g., security cameras, floodlight cameras, etc.) may be armed. In addition, during an armed away mode, one or more of the automation devices 416 (e.g., interior and/or exterior lighting automation systems) may be activated according to an activation schedule (e.g., interior lights on from 5:00 p.m. to 9:00 p.m., exterior lights on from 6:00 p.m. to 8:00 p.m., blinds/shades opened from 12:00 p.m. to 5:00 p.m. and closed from 5:00 p.m. to 4:00 a.m., etc.) in order to provide an indication that somebody is home, even when they are not. In an armed vacation mode, the sensors 414, the automation devices 416, and/or the A/V recording and communication doorbell 402 may be armed and disarmed similar to the armed away mode, however, any alerts and security events may also be sent to neighbors and/or law enforcement. In a disarmed mode, all of the sensors 414 and/or the automation devices 416 may be deactivated (other than the automation devices 416 in use by the users separate from an arming mode of the security system 422). However, in a disarmed mode, the one or more A/V recording and communication doorbells 402 (or other A/V recording and communication devices, e.g., security cameras, floodlight cameras, video doorbells, etc.) may be in an active state for detecting motion and/or recording activity in the field of view of the one or more A/V recording and communication doorbells 402 and/or other devices. In a custom mode, the user/owner of the security system 422 may configure each of the sensors 414, the automation devices 416, and/or the A/V recording and communication doorbells 402 (and/or other A/V recording and communication devices). For example, in a custom mode, "Summer," the user/owner may arm each of the door sensors but disable the window sensors (e.g., where windows may be left open for air flow). In addition, the user/owner may activate each of the A/V recording and communication devices in the back yard to record between 8:00 am and 5:00 p.m. (e.g., because the kids may regularly play in the back yard during the summer months).

In some of the present embodiments, the hub device 412 may analyze the sensor data, the image data 460, the motion data 470, and/or the audio data 462 to determine occupancy data for the property where the security system 422 is located. For example, the sensor data may include motion data from motion sensors of the sensors 414 interior to the property and/or data indicative of a light switch interior to the home being turned on/off within the last 10 seconds, 20 seconds, etc. from a lighting automation system of the automation devices 416, the image data 460 may include the presence of person(s) (e.g., in the form of the biometric data 486), the motion data 470 may include an indication of the presence of persons interior to the home (e.g., in embodiments where one of the A/V recording and communication devices is indoors), and/or the audio data 462 may include voices, which may provide an indication of the presence of person(s). As a result, the hub device 412 may analyze the sensor data, the image data 460, the motion data 470, and/or the audio data 462 to determine the occupancy data. In some of the present embodiments, the occupancy data may be a binary determination, such as occupied and not occupied. In other embodiments, the occupancy data may be more detailed, such as identifying which residents among a plurality of residents are present, or a location of one or more of the plurality of the residents at the property. Once the occupancy data is determined, the hub device 412 may use the occupancy data to determine how to execute the arming action 494 received from the A/V recording and communication doorbell 402 (in some embodiments, based on an analysis of the arming input 490). For example, as described above, the arming action 494 may be different dependent on the current arming status 492 of the security system 422. Similarly, the arming action 494 may be different based on the occupancy data. As an example, if the occupancy data provides an indication of the presence of a person, the arming input 490 may trigger the arming action 494 of activating an armed stay mode of the security system 422. In such an example, if the occupancy data provides an indication that no person(s) are present, the same arming input 490 may trigger the arming action 494 of activating an armed away mode of the security system 422.

Figure 11:
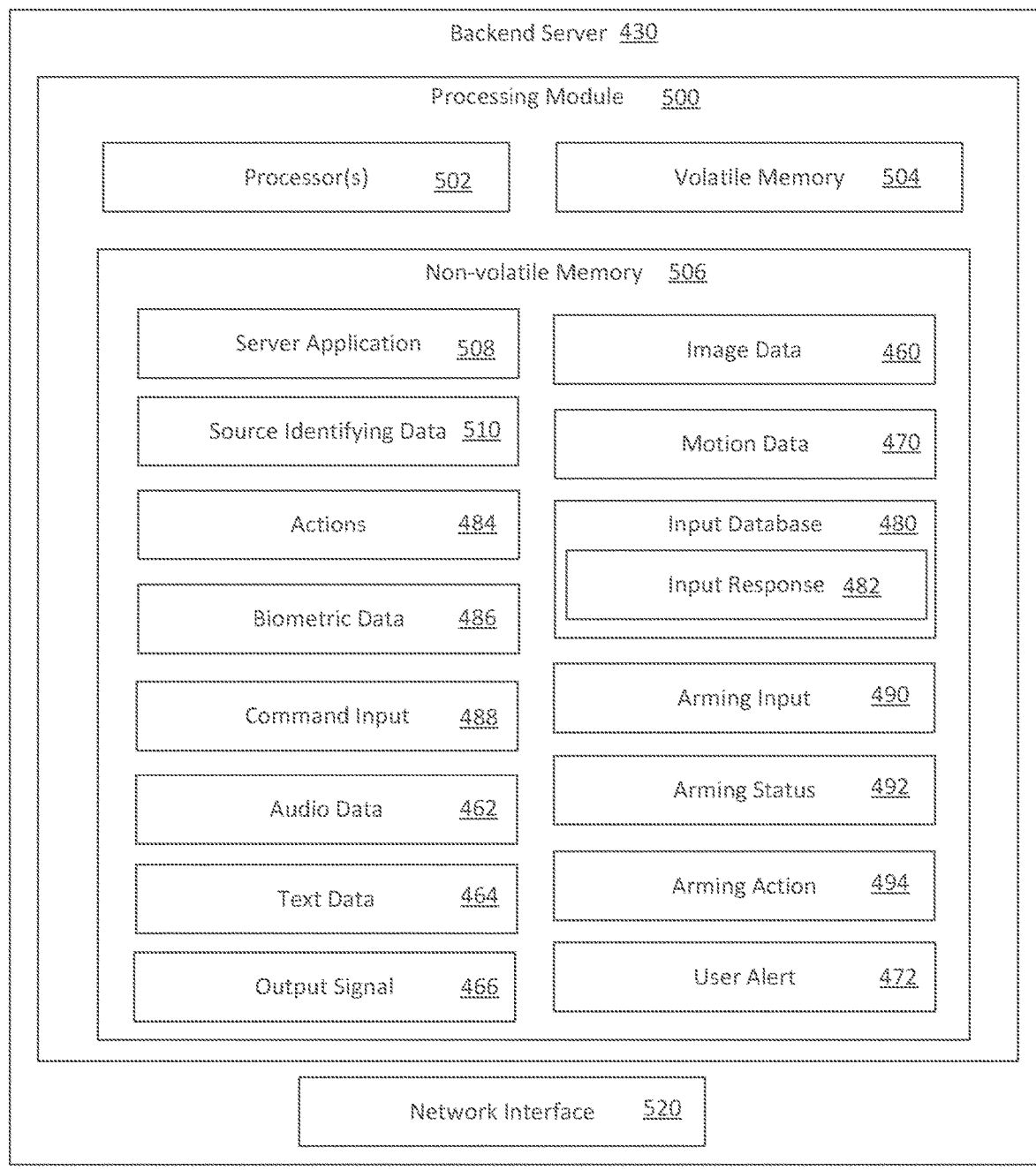
FIG. 11 is a functional block diagram illustrating one embodiment of a backend device according to various aspects of the present disclosure.

FIG. 11 is a functional block diagram illustrating one embodiment of the backend server(s) 430 according to various aspects of the present disclosure. The backend server(s) 430 may comprise a processing module 500 including a processor 502, volatile memory 504, a network interface 520, and non-volatile memory 506. The network interface 520 may allow the backend server(s) 430 to access and communicate with devices connected to the network (Internet/PSTN) 410 (e.g., the A/V recording and communication doorbell 402, the hub device 412, and/or the client devices 404, 406). The non-volatile memory 506 may include a server application 508 that configures the processor 502 to receive the actions 484, the biometric data 486, the audio data 462, the text data 464, the arming action 494, the user alert 472, the image data 460, and/or the motion data 470 from the A/V recording and communication doorbell 402 (e.g., in the output signal 466), and/or the hub device 412. The server application 508 may also configure the processor 502 to transmit the actions 484, the arming actions 494, the user alert 472, and/or the arming status 492 to the A/V recording and communication doorbell 402 and/or the hub device 412.

As described herein, at least some of the processes of the A/V recording and communication doorbell 402 may be executed by the backend server 430. For example, the processor 502 of the backend server 430 may analyze the image data 460 to determine the biometric data 486 (e.g., using facial recognition) for identifying the person(s) in the field of view of the A/V recording and communication doorbell 402.

In further reference to FIG. 11, the non-volatile memory 506 may also include source identifying data 510 that may be used to identify the A/V recording and communication doorbell 402, the hub device 412, and/or the client devices 404, 406. In addition, the source identifying data 410 may be used by the processor 502 of the backend server 430 to determine the client devices 404, 406 associated with the A/V recording and communication doorbell 402 and/or the hub device 412.

In some embodiments, the server application 508 may further configure the processor 502 to generate and transmit a report signal (not shown) to a third-party client device (not shown), which may be associated with a law enforcement agency or the security monitoring service 418, for example. The report signal may include the biometric data 486, the image data 460, the audio data 462, and/or the text data 464. In such embodiments, an operator of the third-party client device may be able to view the biometric data 486, the image data 460, and/or the text data 464 to help in making a determination of whether a person in the field of view of the A/V recording and communication doorbell 402 is an authorized person, as described herein.

In the illustrated embodiment of FIGS. 9-11, the various components including (but not limited to) the processing modules 446, 468, 500, the communication modules 450, 467 and the network interface 520 are represented by separate boxes. The graphical representations depicted in each of FIGS. 9-11 are, however, merely examples, and are not intended to indicate that any of the various components of the A/V recording and communication doorbell 402, the hub device 412, and/or the backend server(s) 430 are necessarily physically separate from one another, although in some embodiments they might be. In other embodiments, however, the structure and/or functionality of any or all of the components of each of the A/V recording and communication doorbell 402, the hub device 412, and/or the backend server 430 may be combined. As an example, the structure and/or functionality of any or all of the components of the A/V recording and communication doorbell 402 may be combined. In addition, in some embodiments the communication module 450 may include its own processor, volatile memory, and/or non-volatile memory. As another example, the structure and/or functionality of any or all of the components of the hub device 412 may be combined. In addition, in some embodiments the communication module 467 may include its own processor, volatile memory, and/or non-volatile memory.

Figure 12:
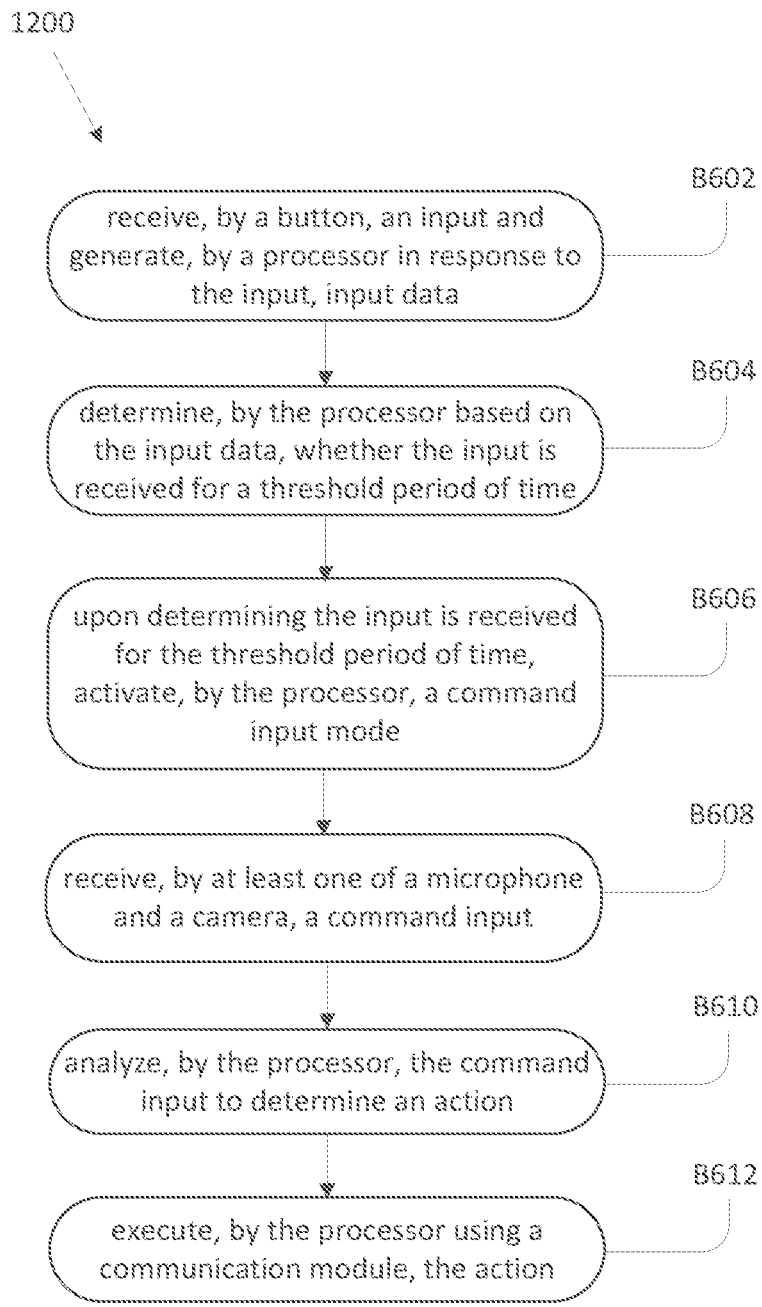
FIGS. 12-16 are flowcharts illustrating processes for input functionality for A/V recording and communication devices according to various aspects of the present disclosure.

Now referring to FIG. 12, FIG. 12 is a flowchart illustrating a process for input functionality for A/V recording and communication devices according to various aspects of the present disclosure. The process 1200, at block B602, receives, by a button, an input and generates, by a processor in response to the input, input data. For example, the processor 452 of the A/V recording and communication doorbell 402 may receive, via the button 445, an input and generate the input data 476 in response. The input may be a touch input or a press input to the button 445. The input may be a single touch/press that is held for an amount of time, and the input data 476 may be generated to indicate the amount of time the touch/press is received. In some of the present embodiments, the input may include multiple touches/presses, and the input data 476 may be generated to indicate the amount of time each touch/press is received and/or the pattern of the touches/presses (e.g., a pattern may be "press and release, press and hold for three seconds, then release, and press and release").

The process 1200, at block B604, determines, by the processor based on the input data, whether the input is received for a threshold period of time. For example, the processor 452 of the A/V recording and communication doorbell 402 may determine, based on the input data 476, whether the input is received for a threshold period of time (e.g., whether the button 445 was pressed/touched continuously for a threshold period of time). The threshold period of time may be, without limitation, half of a second, a second, two seconds, three seconds, or another amount of time dependent on the particular embodiment (e.g., the threshold period of time for the particular input response 492). In some embodiments, the threshold period(s) of time may be configured by a user/owner of the A/V recording and communication doorbell 402.

In some of the present embodiments, in addition to or in lieu of the threshold period of time, the processor 452 may determine if the input satisfies a particular pattern that is indicative of a particular action 484. The pattern may include touches/presses that must be received for a threshold period of time and/or a number of touches/presses that must be received, as described in greater detail below (e.g., at block B616 of the process 1300 of FIG. 13).

In any embodiment, a touch/press for less than the threshold period of time may activate the processor 452 of the A/V recording and communication doorbell 402 to sound a doorbell tone through the speaker 448 and/or through a signaling device installed at the property (e.g., the signaling device 168 of FIG. 3). In addition, a touch/press for less than the threshold period of time may activate the processor 452 of the A/V recording and communication doorbell 402 to generate and transmit the user alert 472 to the client devices 404, 406 to provide an indication to the user of the client devices 404, 406 that a person has pressed the button 445. In other words, if a press/touch is received for less than the threshold period of time, the A/V recording and communication doorbell 402 may provide a more traditional notification that a person has pressed the button 445 of the doorbell 402.

The process 1200, at block B606, upon determining that the input is received for the threshold period of time, activates, by the processor, a command input mode. For example, upon determining that the input is received for the threshold period of time (based on the input data 476) at block B604, the processor 452 of the A/V recording and communication doorbell 402 may activate the command input mode. The command input mode may be configured to allow the person(s) in proximity to the A/V recording and communication doorbell 402 (e.g., the person who provided the input to the button 445 and/or other persons) to provide a command input 488 (or an arming input 490 in embodiments where the A/V recording and communication doorbell 402 is part of a security system 422) in order to control one or more functions and capabilities of the sensors 414, the automation devices 416, the A/V recording and communication doorbell 402, other A/V recording and communication devices installed at the property where the A/V recording and communication doorbell 402 is installed, and/or the entire security system 422. Once in the command input mode, the A/V recording and communication doorbell 402 may listen for, using the microphone 446, and/or look for, using the camera 444, command inputs 488 (and/or arming inputs 490). For example, the A/V recording and communication doorbell 402 may activate the microphone 446 to listen for audible command inputs 488 (and/or arming inputs 490) and/or analyze the image data 460 being captured by the camera 444 to look for visual command inputs 490 (and/or arming inputs 490, e.g., body, facial, and/or hand gestures). In some embodiments, the command inputs 488 (and/or arming inputs 490) may include a combination of visual and audible command inputs 488 (and/or arming inputs 490, e.g., speak a code and make a first or say your name and bow your head).

In some of the present embodiments, the type of command input mode (e.g., audible command input mode, visual command input mode, audible and visual command input mode) may be determined based on the input (using the input data 476). For example, a first threshold period of time may activate an audible command input mode and a second threshold period of time may activate an audible and visual command input mode. In another example, a first pattern of inputs may activate a visual command input mode and a second pattern of inputs may activate an audible command input mode.

The process 1200, at block B608, receives, by at least one of the microphone and a camera, a command input. For example, the processor 452 of the A/V recording and communication doorbell 402 may receive, by at least one of the microphone 446 and/or the camera 444, the command input 488. In embodiments where the A/V recording and communication doorbell 402 is part of the security system 422, the command input 488 may include an arming input 490 for changing the arming status 492 of the security system 422.

The process 1200, at block B610, analyzes, by the processor, the command input to determine an action. For example, the processor 452 of the A/V recording and communication doorbell 402 may analyze the command input 488 (and/or the arming input 490) to determine an action 484 (and/or an arming action 494). The actions 484 may include any number of actions 484 for controlling the sensors 414, the automation devices 416, the A/V recording and communication doorbell, and/or other A/V recording and communication devices. In some of the present embodiments, the actions 484 may include arming actions 494 (in embodiments where the property that the A/V recording and communication doorbell 402 is installed includes the security system 422). Each of the actions 484 may have an associated command input 488 (e.g., audible, visual, or a combination thereof). As described above, a single command input 488 (and/or arming input 490) may have different actions 484 dependent on the current status of the sensors 414, the automation devices 416, the security system 422, and/or the A/V recording and communication doorbell 402. For example, if a door is locked, a command input 488 may trigger the action 484 of unlocking the door, and if the door is unlocked, the same command input 488 may trigger the action 484 of locking the door. As another example, an arming input 490 may trigger the arming action 494 of disarming the security system 422 when the security system 422 is armed, and the same arming input 490 may trigger the arming action 494 of arming the security system 422 (e.g., to an armed stay mode) when the security system 422 is disarmed.

The process 1200, at block B612, executes, by the processor using the communication module, the action. For example, the processor 452 of the A/V recording and communication doorbell 402, using the communication module 450, may execute the action 484 (and/or the arming action 494). In some of the present embodiments, the A/V recording and communication doorbell 402 may execute the action 484 itself. For example, if the action 484 includes establishing a two-way communication with the security monitoring service 418 and/or law enforcement, the A/V recording and communication doorbell 402 may establish the two-way communication. As another example, if the action 484 includes sounding an alarm, the A/V recording and communication doorbell 402 may sound an alarm tone through the speaker 448.

In other embodiments, executing the action 484 may include generating and transmitting a request for the action 484 to the sensors 414, the automation devices 416, and/or the hub device 412 (in some embodiments, via the backend server 430). The action request may provide an indication to the sensors 414, the automation devices 416, and/or the hub device 412 of the action 484, and in response, the status of the sensors 414, the automation devices 416, and/or the hub device 412 may be updated to reflect the action 484. For example, in response to receiving a command input 488 indicative of the action 484 of locking the front door, the A/V recording and communication doorbell 402 may transmit a lock request to a door lock automation device of the automation devices 416, which may include a door lock installed at the front door of the property.

Figure 13:
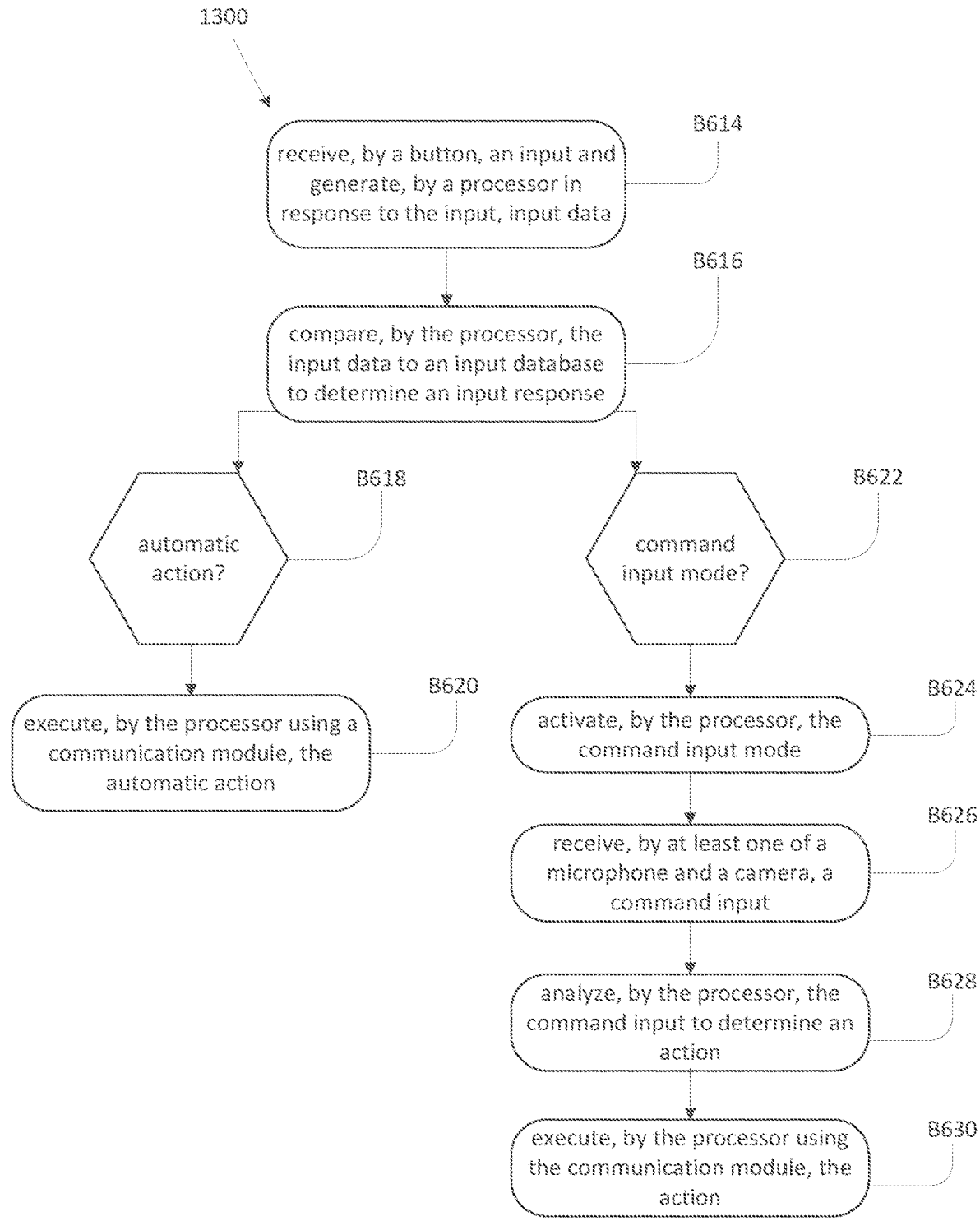

Now referring to FIG. 13, FIG. 13 is a flowchart illustrating a process for input functionality for A/V recording and communication devices according to various aspects of the present disclosure. The process 1300, at block B614, receives, by a button, an input and generates, by a processor in response to the input, input data. For example, the processor 452 of the A/V recording and communication doorbell 402 receives, via the button 445, an input and generates the input data 476 in response. This process may be similar to that of block B602 of the process 1200 of FIG. 12, described above.

The process 1300, at block B616, compares, by the processor, the input data to an input database to determine an input response. For example, the processor 452 of the A/V recording and communication doorbell 402 may compare the input data 476 to the input database 480 to determine the input response 482. The input database 480 may include input responses 482, such as to execute an automatic action, to activate a command input mode, and/or to activate an arming input mode.

The process 1300, at block B618, determines, based on the comparison at block B616, that the input response is an automatic action. For example, based on the comparison of the input data 476 to the input database 480, the processor 452 of the A/V recording and communication doorbell 402 may determine that the input response 482 is to automatically execute one of the actions 484 (and/or the arming actions 494). For example, based on the input data 476 generated from the type of input (e.g., the period of time the input was received, the pattern of the input, etc.), the A/V recording and communication doorbell 402 may execute at least one of the actions 484 (and/or arming actions 490) automatically, such as, without limitation, to unlock/lock the door, turn on/off lights, and/or establish a two-way communication with law enforcement. In such embodiments, the A/V recording and communication doorbell 402 may not enter a command input mode and/or an arming input mode. However, in some of the present embodiments, the input response 482, based on the input data 476, may trigger both an automatic action and activate a command input mode and/or an arming input mode. For example, the input data 476 may trigger the automatic action 484 of unlocking the door, and may trigger the command input mode (and/or arming input mode) for allowing a person in the proximity of the A/V recording and communication doorbell 402 to speak a code, a password, or a passphrase for disarming the security system.

The process 1300, at block B620, executes, by the processor, using a communication module, the automatic action. For example, the processor 452 of the A/V recording and communication doorbell 402 may execute the action 484 (and/or the arming action 494) using the communication module 450 without requiring a command input 488 and/or an arming input 490. This process may be similar to that of block B612 of the process 1200 of FIG. 12, described above.

The process 1300, at block B622, determines, based on the comparison at block B616, that the input response is to activate a command input mode. For example, the processor 452 of the A/V recording and communication doorbell 402, based on the comparison of the input data 476 to the input database 480, may determine that the input response 482 is to activate the command input mode (and/or the arming input mode). The command input mode (and/or the arming input mode), as described above, may trigger the A/V recording and communication doorbell 402 to listen for audible command inputs 488 (and/or arming inputs 490) using the microphone 446 and/or analyze the image data 460 being recorded by the camera 444 to determine visual command inputs 488 (and/or arming inputs 490, e.g., hand, body, and/or facial gestures).

The process 1300, at block B624, activates, by the processor, a command input mode. For example, the processor 452 of the A/V recording and communication doorbell 402 may activate the command input mode (and/or the arming input mode). As described above, once in the command input mode, the A/V recording and communication doorbell 402 may provide an indication that the doorbell 402 is in the command input mode. For example, the A/V recording and communication doorbell may provide an audible indication using the speaker 448 and/or may provide a visual representation using a light display, as described above.

The process 1300, at block B626, receives, by at least one of a microphone and a camera, a command input. For example, the command input 488 (and/or the arming input 490) may be received by at least one of the camera 444 and the microphone 446 of the A/V recording and communication doorbell 402. This process may be similar to that of block B608 of the process 1200 of FIG. 12, described above.

The process 1300, at block B628, analyzes, by the processor, the command input to determine an action. For example, the processor 452 of the A/V recording and communication doorbell 402 may analyze the command input 488 (and/or the arming input 490) to determine an action 484 (and/or an arming action 494). This process may be similar to that of block B610 of the process 1200 of FIG. 12, described above.

The process 1300, at block B630, executes, by the processor using the communication module, the action. For example, the processor 452 of the A/V recording and communication doorbell 402, using the communication module 450, may execute the action 484 (and/or the arming action 494). This process may be similar to that of block B612 of the process 1200 of FIG. 12, described above.

Figure 14:
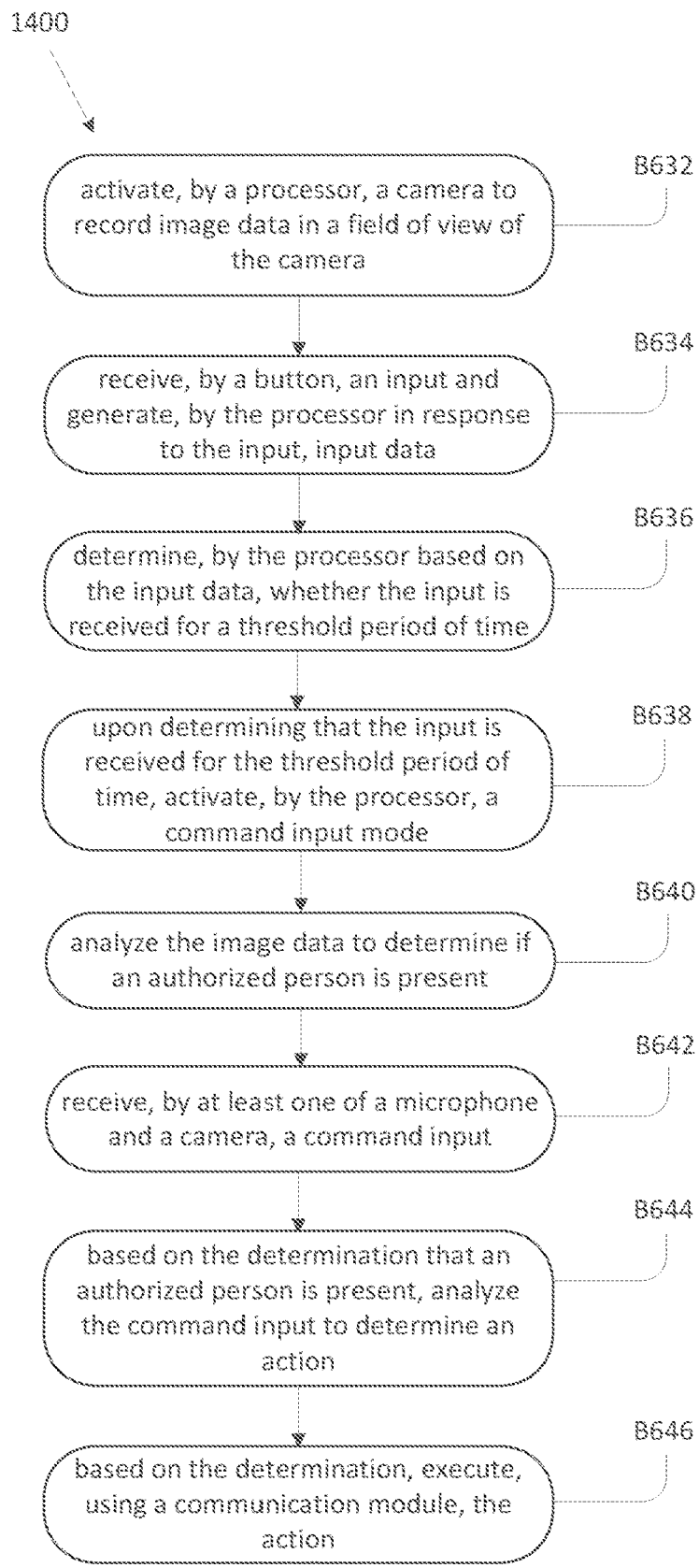

Now referring to FIG. 14, FIG. 14 is a flowchart illustrating a process for input functionality for A/V recording and communication devices according to various aspects of the present disclosure. The process 1400, at block B632, activates, by a processor, a camera to record image data in a field of view of the camera. For example, the processor 452 of the A/V recording and communication doorbell 402 may activate the camera 444 to record the image data 460 in the field of view of the camera 444. In some of the present embodiments, the camera 444 may be activated in response to the A/V recording and communication doorbell 402 detecting motion in the field of view of the A/V recording and communication doorbell 402. For example, the motion sensor 474 and/or the camera 444 may detect motion in the field of view of the motion sensor 474 and/or the field of view of the camera 444, respectively, and, in response, the A/V recording and communication doorbell 402 may generate the motion data 470. The motion data 470 may be analyzed to determine if a person, animal, and/or object of interest is present, and if a person, animal, and/or object of interest is present, the processor 452 may activate the camera 444 to record the image data 460.

The process 1400 at block B634, receives, by a button, an input and generates, by the processor in response to the input, input data. For example, the processor 452 of the A/V recording and communication doorbell 402 may receive, via the button 445, an input and generate the input data 476 in response. This process may be similar to that of block B602 of the process 1200 of FIG. 12 and to block B614 of the process 1300 of FIG. 13, described above.

The process 1400, at block B636, determines, by the processor based on the input data, whether the input is received for a threshold period of time. For example, the processor 452 of the A/V recording and communication doorbell 402 may determine, based on the input data 476, whether the input is received for a threshold period of time (e.g., whether the button 445 was pressed/touched continuously for a threshold period of time). This process may be similar to that of block B604 of the process 1200 of FIG. 12, described above.

The process 1400, at block B638, upon determining that the input is received for a threshold period of time, activates, by the processor, a command input mode. For example, upon determining that the input is received for the threshold period of time (based on the input data 476) at block B604, the processor 452 of the A/V recording and communication doorbell 402 may activate the command input mode (and/or the arming input mode). This process may be similar to that of block B606 of the process 1200 of FIG. 12, described above.

The process 1400, at block B640, analyzes the image data to determine if an authorized person is present. For example, the processor 452 of the A/V recording and communication doorbell 402 (and/or the processor 502 of the backend server 430 after receiving the image data 460 from the A/V recording and communication doorbell 402 over the user's network 408 and the network (Internet/PSTN) 410) may analyze the image data 460 to determine if an authorized person is present. The determination of whether any of the person(s) in the image data 460 are authorized may be done using computer vision or the like, as described above (e.g., facial recognition, facial detection, etc.). In some of the present embodiments, the image data 460 may be compared to a database of authorized persons. The database of authorized persons may be created by the user/owner of the A/V recording and communication doorbell 402. For example, the user/owner may tag persons from historical image data 460 captured by the A/V recording and communication doorbell 402 (and/or other A/V recording and communication devices installed at the property) as authorized. As another example, the user/owner may upload images of authorized persons using the client devices 404, 406. In another example, authorized persons may be added to the database of authorized persons by third parties (e.g., by a house cleaning service, by a delivery service, etc.), where the third parties may provide services to the user/owner at the property. In such an example, the user/owner may verify the authorized persons of the third parties prior to the authorized persons being added to the database of authorized persons.

The process 1400, at block B642, receives, by at least one of a microphone and a camera, a command input. For example, the command input 488 (and/or the arming input 490) may be received by at least one of the camera 444 and the microphone 446 of the A/V recording and communication doorbell 402. This process may be similar to that of block B608 of the process 1200 of FIG. 12 and block B626 of the process 1300 of FIG. 13, described above.

The process 1400, at block B644, upon determining that an authorized person is present, analyzes the command input to determine an action. For example, the processor 452 of the A/V recording and communication doorbell 402 may analyze the command input 488 (and/or the arming input 490) to determine an action 484 (and/or an arming action 494) upon determining that an authorized person is present based on the image data 460. For example, if no authorized persons are present, the A/V recording and communication doorbell 402 may not react to the command inputs 488 (and/or the arming inputs 490). In some of the present embodiments, certain command inputs 488 (and/or arming inputs 490) may require a determination that the command input 488 (and/or the arming input 490) is provided from an authorized person (or that an authorized person is present) and other command inputs 488 (and/or arming inputs 490) may not require that an authorized person be present. In such embodiments, the processor 452 may first determine whether the command input 488 (and/or the arming input 490) requires an authorized person to be present.

The process 1400 of FIG. 14 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIG. 14, a person may approach the A/V recording and communication doorbell 402, which may be located beside a door to a house. In response to approaching the A/V recording and communication doorbell 402, the motion sensor 474 and/or the camera 444 of the A/V recording and communication doorbell 402 may detect the motion of the person approaching and generate the motion data 470. The A/V recording and communication doorbell 402 may analyze the motion data 470 to determine that the person is present and, in response, may activate the camera 444 to record the image data 460 in the field of view of the camera 444 (at block B632). The person may approach the door, and provide an input to the button 445 of the A/V recording and communication doorbell 402. The person may be the owner of the property where the A/V recording and communication doorbell 402 is located and thus may know that by pressing and holding the button 445 for five seconds (e.g., the threshold period of time), the A/V recording and communication doorbell 402 enters the command input mode. In response to receiving the input to the button 445, the A/V recording and communication doorbell 402 may generate the input data 476 (at block B634). The A/V recording and communication doorbell 402 may then analyze the input data 476 to determine, based on the input data 476, whether the button 445 was pressed for the threshold period of time (e.g., five seconds, at block B636). Because the person pressed the button 445 for five or more seconds, the A/V recording and communication doorbell 402 may activate the command input mode (at block B638). The A/V recording and communication doorbell 402 may provide the person a visual and/or audible notification when the command input mode has been activated so that the person knows when they can stop holding the button 445.

Once the command input mode has been activated, and prior to responding to any command inputs 488 from the person, the A/V recording and communication doorbell 402 may first determine that the person is an authorized person (e.g., a person who is authorized to provide command inputs 488). In some of the present embodiments, the A/V recording and communication doorbell 402 may analyze the image data 460 generated by the camera 444 to determine, using facial recognition and/or other computer vision technologies, as described above, whether the person is authorized (e.g., by comparing the biometric data 486 of the person generated using facial recognition to a database of authorized persons, at block B640). In other embodiments, in addition to or in lieu of the biometric data 486 generated using facial recognition or other computer vision technologies, the A/V recording and communication doorbell 402 may use other biometric data 486 to determine if the person is authorized. For example, in embodiments where the A/V recording and communication doorbell 402 includes one or more biometric devices 447 (e.g., fingerprint scanners, retina scanners, etc.), the A/V recording and communication doorbell 402 may generate the biometric data 486 using the one or more biometric devices 447 and compare the biometric data 486 to a database of authorized persons. For example, if the A/V recording and communication doorbell 402 includes a fingerprint scanner, the person may provide their fingerprint (e.g., in response to being prompted by the A/V recording and communication doorbell 402 to do so and/or if the button 445 includes the fingerprint scanner, the fingerprint may be scanned during the press of the button 445) and the fingerprint may be compared to the fingerprints included in the database of authorized persons to determine if the person is authorized.

In some of the present embodiments, the determination of whether the person is authorized may be performed by the backend server 430. For example, the A/V recording and communication doorbell 402 may transmit the image data 460 and/or the biometric data 486 to the backend server 430 over the user's network 408 and/or the network (Internet/PSTN) 410. The backend server 430 may analyze the image data 460 to determine the biometric data 486 and/or compare the biometric data 486 generated by the A/V recording and communication doorbell 402 (e.g., facial recognition data, fingerprint recognition data, iris recognition data, retina recognition data, etc.) to the database of authorized persons. Once a determination is made that the person is or is not authorized, the backend server 430 may transmit the result of the determination to the A/V recording and communication doorbell 402. In addition, if the determination is that the person is not authorized, the backend server 430 may generate the user alert 472 and transmit the user alert to the client devices 404, 406, alert law enforcement, notify the security monitoring service 418, etc.

Once in the command input mode, the A/V recording and communication doorbell 402 may receive, from the person, at least one of an audible and/or visual command input 488 (at block B642). For example, the person may hold an open hand up to the camera 444, which may be the command input 488 for unlocking the front door (e.g., unlocking a lock that is part of a locking automation device of the automation devices 416). In addition, the command input 488 for unlocking the front door may also include a spoken code, so the person may speak the code, "5749." After receiving the command input 488, and based on the determination (at block B640) that the person is authorized, the A/V recording and communication doorbell 402 may analyze the command input 488 (e.g., the open hand from the image data 460 and the spoken code, password, or passphrase from the audio data 462) to determine the action 484 (e.g., to unlock the door, at block B644). Based on the determination that the action 484 is unlocking the door, the A/V recording and communication doorbell 402 may transmit an unlock signal to the lock automation device that controls the lock installed at the door (e.g., may execute the action 484, at block B646). The unlock signal may be transmitted directly to the lock automation device, may be transmitted to the hub device 412 and forwarded onto the lock automation device, and/or may be transmitted to the backend server 430 and forwarded onto the hub device 412 and/or the lock automation device.

As a result of the process of FIG. 14, the person may be able to access the property where the A/V recording and communication doorbell 402 is installed without the use of a physical key. This may prove useful if the person is the homeowner and forgot their key, or if the person is a guest that does not have a physical key but was given the access information (e.g., the command input 488) by the homeowner for accessing the property, or if the person is a service provider who was given temporary access by the homeowner (in such an embodiment, the command input 488 may be a temporary command input 488 for unlocking the door configured by the homeowner to allow the service provider temporary access).

Other embodiments for the process 1400 of FIG. 14 (and the processes 1200 and 1300 of FIGS. 12 and 13, respectively) are also contemplated without departing from the scope of the present disclosure. For example, the processes 1200, 1300, and 1400 may be used for turning on/off a light automation device and/or other automation devices 416, for contacting the security monitoring service 418, for arming/disarming the security system 422, etc. In each of the different embodiments, different inputs (e.g., threshold periods of time for holding the button, patterns of pressing the button 445, or a combination thereof) may generate different input responses 482 (e.g., activate the command input mode, activate the arming input mode, execute an action 484 automatically, etc.) and different command inputs 488 (and/or arming inputs 490) may generate any of a number of different actions 484 (and/or arming actions 494) for controlling the A/V recording and communication doorbell 402, the sensors 414, the automation devices 416, and/or the security system 422. In addition, because the biometric data 486 may be used to verify authorized persons, the actions 484 and/or arming actions 494 may only be executed by authorized persons, thereby contributing to the safety and security of the property that the A/V recording and communication doorbell 402 is installed. The processes 1200, 1300, and 1400 may increase the functionality and usefulness of the A/V recording and communication doorbell 402 by enabling the person (e.g., homeowner, guest, etc.) to control the features and functionality of the doorbell 402, the sensors 414, the automation devices 416, and/or the security system 422 from the A/V recording and communication doorbell 402 without having to enter the property and/or control each of the doorbell 402, the sensors 414, the automation devices 416, and the security system 422 separately.

Figure 15:
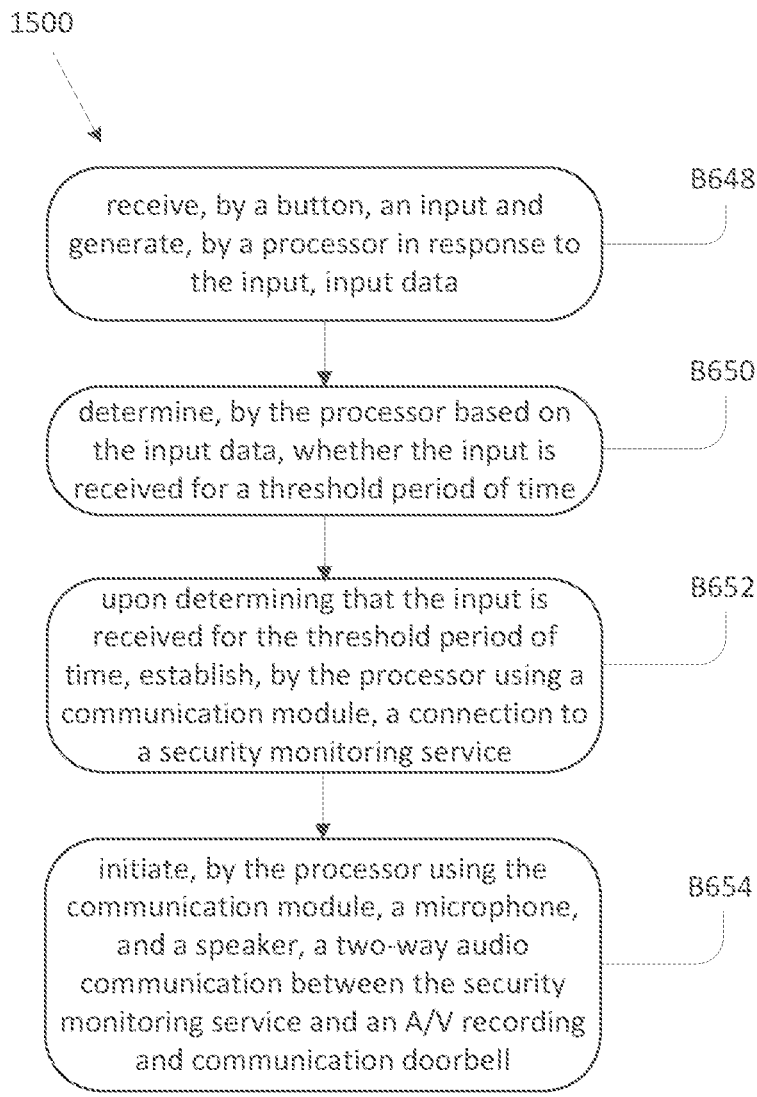

Now referring to FIG. 15, FIG. 15 is a flowchart illustrating a process for input functionality for A/V recording and communication devices according to various aspects of the present disclosure. The process 1500, at block B648, receives, by a button, an input and generates, by a processor in response to the input, input data. For example, the A/V recording and communication doorbell 402 may receive, via the button 445, the input and generate, by the processor 452 in response to the input, the input data 476. This process may be similar to that of block B602 of the process 1200 of FIG. 12, block B614 of the process 1300 of FIG. 13, and/or block B634 of the process 1400 of FIG. 14, described above.

The process 1500, at block B650, determines, by the processor based on the input data, whether the input is received for a threshold period of time. For example, the processor 452 of the A/V recording and communication doorbell 402 may determine, based on the input data 476, whether the input is received for a threshold period of time (e.g., whether the button 445 was pressed/touched continuously for a threshold period of time). This process may be similar to that of block B604 of the process 1200 of FIG. 12 and/or block B636 of the process 1400 of FIG. 14, described above.

The process 1500, at block B652, upon determining that the input is received for the threshold period of time, establishes, by the processor, a connection to a security monitoring service. For example, the processor 452 of the A/V recording and communication doorbell 402, upon determining that the input is received for the threshold period of time (e.g., based on the input data 476), may establish, using the communication module 450, a connection to the security monitoring service 418. For example, in some of the present embodiments, the A/V recording and communication doorbell 402 may connect automatically, over the network (Internet/PSTN) 410 with the security monitoring service 418, may place a call to the security monitoring service 418 using cellular or PSTN capabilities of the A/V recording and communication doorbell 402 (in embodiments where the A/V recording and communication doorbell 402 includes cellular capabilities and/or is connected to a landline). In other embodiments, the A/V recording and communication doorbell 402 may transmit a call request signal to the hub device 412 (and/or the backend server 430), and the hub device 412 (and/or the backend server 430) may establish the connection to the security monitoring service 418. In such embodiments, the A/V recording and communication doorbell 402 may act as the speaker, the microphone, and in some embodiments the camera for the hub device 412 (and/or the backend server 430) during the communication with the security monitoring service 418.

The process 1500, at block B654, initiates, by the processor using the communication module, a microphone, and a speaker, a two-way audio communication between the security monitoring service and an A/V recording and communication doorbell. For example, the processor 452 of the A/V recording and communication doorbell 402, using the communication module 450, may initiate a two-way audio communication between the security monitoring service 418 and the A/V recording and communication doorbell 402. In some of the present embodiments, the A/V recording and communication doorbell 402 may also transmit the image data 460 and/or the biometric data 486 to the security monitoring service 418. For example, the security monitoring service 418 may receive the image data 460 and the biometric data 486 (e.g., facial recognition data, voice recognition data, fingerprint recognition data, etc.) and use the image data 460 and/or the biometric data 486 to determine if the person(s) in the field of view of the camera 444 is/are authorized.

In any embodiment, the person on the A/V recording and communication doorbell 402 end of the two-way communication may request that the security monitoring service 418 execute an action 484 and/or an arming action 494. For example, the person may request access to the property (e.g., request that the security monitoring service 418 transmit an unlock request to a lock automation device via the A/V recording and communication doorbell 402, the hub device 412, and/or the backend server 430, and/or request that the security monitoring service 418 transmit a disarm request to the security system 422 via the A/V recording and communication doorbell 402, the hub device 412, and/or the backend server 430). In response, the security monitoring service 418 may confirm the identity of the person(s) requesting access using the image data 460 and/or the biometric data 486 and, in response to confirming that the person is authorized, execute the action 484 and/or arming action 494 requested by the person (e.g., lock/unlock doors, arm/disarm the security system 422, turn lights on/off, etc.). In some of the present embodiments, the security monitoring service 418 may not use (and/or receive) the image data 460 and/or the biometric data 486, and may only request a security code (e.g., a numeric code, code word(s), etc.) from the person prior to executing the action 484 and/or the arming action 494. In any embodiment, executing the action 484 and/or the arming action 494 by the security monitoring service 418 may include transmitting a request for the action to the A/V recording and communication doorbell 402, the hub device 412, the backend server 430, the sensors 414 (in embodiments where the sensors 414 communicate over the network (Internet/PSTN) 410 directly), and/or the automation devices 416 (in embodiments where the automation devices 416 communicate over the network (Internet/PSTN) 410 directly).

As a result, by providing an input to the button 445 (e.g., a press/touch of the button 445 for the threshold period of time, a certain pattern of presses/touches, etc.), the person is able to use the A/V recording and communication doorbell 402 as a connection point for a communication with the security monitoring service 418. The person may then use the communication with the security monitoring service 418 for accessing the property and/or controlling the security system 422, which may be useful when the person is the property owner and forgot their key, or when the person is outside of their home and forgot to arm the security system 422 but doesn't want to re-enter, or when the person is a guest and requires access to the property, etc.

Figure 16:
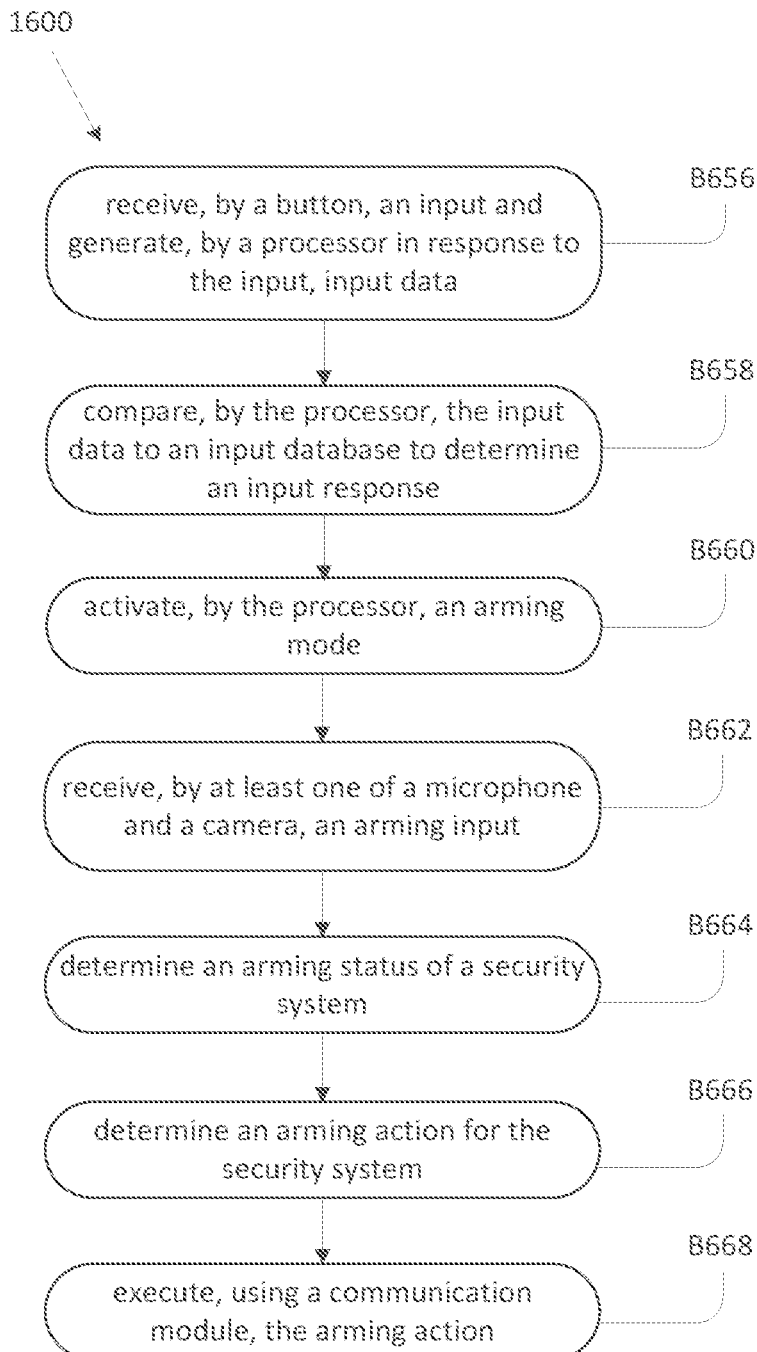

Now referring to FIG. 16, FIG. 16 is a flowchart illustrating a process for input functionality for A/V recording and communication devices according to various aspects of the present disclosure. The process 1600, at block B656, receives, by a button, an input and generates, by a processor in response to the input, input data. For example, the A/V recording and communication doorbell 402 may receive, via the button 445, the input and generate, by the processor 452 in response to the input, the input data 476. This process may be similar to that of block B602 of the process 1200 of FIG. 12, block B614 of the process 1300 of FIG. 13, block B634 of the process 1400 of FIG. 14, and/or block B648 of the process 1500 of FIG. 15, described above.

The process 1600, at block B658, compares, by the processor, the input data to an input database to determine an input response. For example, the processor 452 of the A/V recording and communication doorbell 402 may compare the input data 476 to the input database 480 to determine the input response 482. The input database 480 may include input responses 482 such as to execute an automatic action, to activate a command input mode, and/or to activate an arming input mode, as described above. This process may be similar to that of block B616 of the process 1300 of FIG. 13, described above.

The process 1600, at block B660, activates, by the processor, an arming mode. For example, the processor 452 of the A/V recording and communication doorbell 402, based on the comparison of the input data 476 to the input database 480, may activate the arming input mode. In response to activating the arming input mode, the A/V recording and communication doorbell 402 may generate an indication that the doorbell 402 is in the arming input mode. For example, the A/V recording and communication doorbell 402 may generate an audible indication using the speaker 448 and/or a visual indication (e.g., using a light display) as described above. As described above, the arming input mode may be similar to the command input mode, but the arming input mode may be activated when the A/V recording and communication doorbell 402 is part of and/or in communication with the security system 422. In such embodiments where the A/V recording and communication doorbell 402 is part of and/or in communication with the security system 422, the arming input mode may include the command input mode. In other words, during the arming input mode, the A/V recording and communication doorbell 402 may be configured to receive both command inputs 488 and arming inputs 490, and may be configured to execute the actions 484 and the arming actions 494. However, in some of the present embodiments, the arming input mode and the command input mode may be different. In such embodiments, the arming input mode and the command input mode may be different input responses 482 triggered by different inputs to the button 445 (e.g., five second press and hold for the command input mode and ten second press and hold for the arming input mode).

The process 1600, at block B662, receives, by at least one of a microphone and a camera, an arming input. For example, the camera 444 and/or the microphone 446 of the A/V recording and communication doorbell 402 may receive the arming input 490. For example, the arming input 490 may be an audible and/or visual input indicative of an arming action 494 (e.g., a request to change the arming status 492 of the security system 422).

The process 1600, at block B664, determines an arming status of a security system. For example, the processor 452 of the A/V recording and communication doorbell 402 (and/or the processor 502 of the backend server 430 and/or the processor 469 of the hub device 412) may determine the arming status 492 of the security system 422. In some of the present embodiments, the A/V recording and communication doorbell 402 may retrieve and/or receive the arming status 492 of the security system 422 from the hub device 412 and/or the backend server 430 each time the arming input mode is activated and/or periodically. In other embodiments, such as where the A/V recording and communication doorbell 402 may transmit the arming input 490 to the hub device 412, the hub device 412 may determine the arming status 492 of the security system 422 (e.g., because the hub device 412 may control the security system 422, the hub device 412 may always know the arming status 492). In some of the present embodiments, such as where the A/V recording and communication doorbell 402 may transmit the arming input 490 to the backend server 430, the backend server 430 may retrieve and/or receive the arming status 492 of the security system 422 in response to receiving an arming input 490 and/or periodically (e.g., during check-ins from the hub device 412, after each change in the arming status 492, at predetermined intervals, etc.).

The process 1600, at block B666, determines an arming action for the security system. For example, the processor 452 of the A/V recording and communication doorbell 402 (and/or the processor 502 of the backend server 430 and/or the processor 469 of the hub device 412) may determine the arming action 494 for the security system 422 based on the arming input 490 and/or the arming status 492. In some of the present embodiments, the A/V recording and communication doorbell 402, the backend server 430, and/or the hub device 412 may determine the arming action 494 (e.g., to update the arming status 492 to disarmed, armed away, armed stay, etc.) based on the arming input 490 (e.g., the audible and/or visual arming input 490) and the arming status 492 (e.g., based on the same arming input 490, if the arming status 492 is disarmed, the arming action 494 may be to activate an armed away mode of the security system 422 and if the arming status 492 is armed stay, the arming action 494 may be to disarm the security system 422, etc.).

The process 1600, at block B668, executes, using a communication module, the arming action. For example, in some of the present embodiments, executing the arming action 494 may include the processor 452 of the A/V recording and communication doorbell 402, using the communication module 450, transmitting the request for the arming action 494 to the hub device 412 (in some embodiments, via the backend server 430), and the hub device 412 executing the arming action 494. As another example, in some of the present embodiments, executing the arming action 494 may include the processor 502 of the backend server 430, using the network interface 520, transmitting the request for the arming action 494 to the hub device 412 and the hub device 412 executing the arming action 494. In another example, in any of the present embodiments, the processor 469 of the hub device 412 may execute the arming action 494 (e.g., may update the arming status 492 of the security system 422). In some of the present embodiments, the hub device 412 may execute the arming action 494 in response to receiving the request for the arming action 494 from the A/V recording and communication doorbell 402 and/or the backend server 430. In other embodiments, the hub device 412 may execute the arming action 494 after making the determination of the arming action 494 using the processor 469.

As described above, depending on the specific embodiment, the A/V recording and communication doorbell 402, the backend server 430, the hub device 412, and/or a combination thereof may execute block B664, block B666, and/or block B668 of the process 1600 of FIG. 16.

The process 1600 of FIG. 16 may enable the user/owner of the A/V recording and communication doorbell 402 and/or the security system 422 to arm and/or disarm the security system 422 from the A/V recording and communication doorbell 402. Because the user/owner is not required to enter the property to arm/disarm the security system 422 using the process 1600, the user/owner may be more likely to arm/disarm the security system 422, thereby increasing the safety and security of the property. In addition, because the A/V recording and communication doorbell 402 may be capable of generating the biometric data 486, the person providing the arming input 490 may be verified (e.g., compared against a database of authorized persons) prior to executing the arming action 494, further adding another layer of security to the security system 422.

Figure 17:
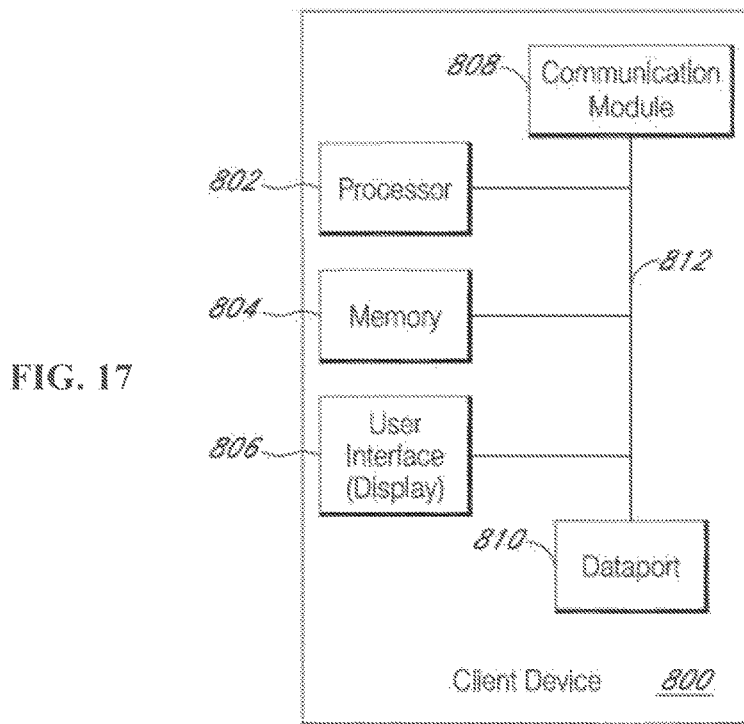
FIG. 17 is a functional block diagram of a client device on which the present embodiments may be implemented according to various aspects of the present disclosure.

FIG. 17 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 17, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 18:
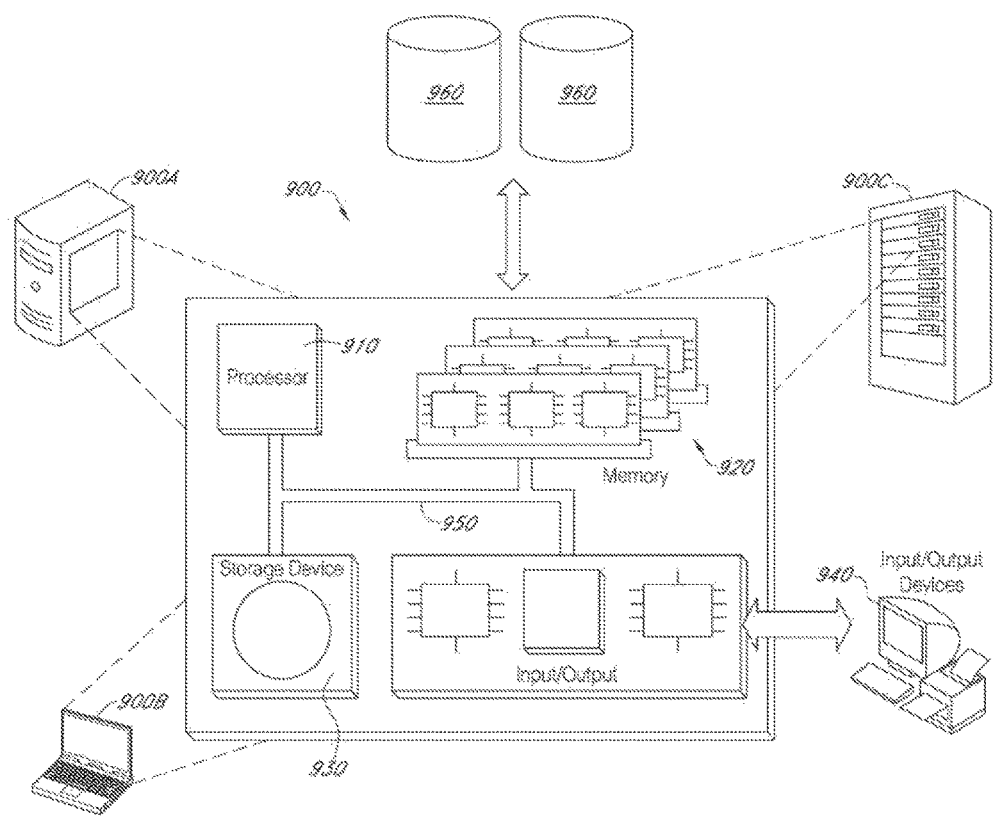
FIG. 18 is a functional block diagram of a general-purpose computing system on which the present embodiments may be implemented according to various aspects of present disclosure.

FIG. 18 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video (A/V) recording and communication doorbell comprising:
    a button;
    a camera;
    a microphone;
    a communication module;
    one or more processors; and
    a non-transitory machine-readable memory storing a program, the program executable by at least one of the processors, the program comprising sets of instructions for:
    receiving, by the button, an input and generating, by the processor in response to the input, input data;
    determining, by the processor based on the input data, that the input is received for a threshold period of time, the input data indicating that the button was pressed for the threshold period of time;
    upon determining that the input is received for the threshold period of time, establishing, by the processor using the communication module, a connection to a security monitoring service; and
    in response to establishing the connection, initiating, by the processor using the communication module, the microphone, and the speaker, a two-way audio communication between the security monitoring service and the A/V recording and communication doorbell.

2. The A/V recording and communication doorbell of claim 1, wherein the input includes at least one of a touch of the button and a press of the button.

3. The A/V recording and communication doorbell of claim 1, wherein the A/V recording and communication doorbell further includes biometric capabilities.

4. The A/V recording and communication doorbell of claim 3, wherein the biometric capabilities include at least one of fingerprint recognition, eye recognition, voice recognition, and facial recognition.

5. The A/V recording and communication doorbell of claim 4, wherein the program further comprises a set of instructions for:
    generating, by the processor using the biometric capabilities, biometric data of a person in a field of view of the A/V recording and communication doorbell;
    determining, by the processor based on the biometric data, an identification of the person; and
    transmitting, by the processor using the communication module, the identification of the person to the security monitoring service.

6. The A/V recording and communication doorbell of claim 5, wherein determining the identification of the person includes comparing, by the processor, the biometric data to a biometric database.

7. The A/V recording and communication doorbell of claim 1, wherein the threshold period of time is configurable by a user of the A/V recording and communication doorbell.

8. The A/V recording and communication doorbell of claim 1, wherein the program further comprises a set of instructions for:
    receiving, by the processor using the communication module, from the security monitoring service, an action; and
    executing, using the communication module, the action.

9. The A/V recording and communication doorbell of claim 8, wherein the action includes one of changing an arming status of a security system and unlocking/locking a door.

10. The A/V recording and communication doorbell of claim 1, wherein the program further comprises a set of instructions for:
    activating, by the processor, the camera to record image data in a field of view of the camera; and transmitting, by the processor using the communication module, the image data to the security monitoring service.

11. A method for a security system monitored by a security monitoring service and including an audio/video (A/V) recording and communication doorbell, the A/V recording and communication doorbell including a processor, a button, a camera, a communication module, a speaker, and a microphone, the method comprising:
   activating, by the processor, the camera to record image data in a field of view of the camera;
   receiving, by the button, an input and generating, by the processor in response to the input, input data;
   determining, by the processor based on the input data, that the input is received for a threshold period of time, the input data indicating that the button was pressed for the threshold period of time;
   determining, by the processor based on the image data, that an authorized person is present;
   upon determining that the input is received for the threshold period of time and determining that an authorized person is present, establishing, by the processor using the communication module, a connection to the security monitoring service; and
   in response to establishing the connection, initiating, by the processor using the communication module, the microphone, and the speaker, a two-way audio communication between the security monitoring service and the A/V recording and communication doorbell.

12. The method of claim 11, wherein the input includes at least one of a touch of the button and a press of the button.

13. The method of claim 11, wherein the A/V recording and communication doorbell further includes biometric capabilities.

14. The method of claim 13, wherein the biometric capabilities include at least one of fingerprint recognition, eye recognition, voice recognition, and facial recognition.

15. The method of claim 14, further comprising:
   generating, by the processor using the biometric capabilities, biometric data of a person in a field of view of the A/V recording and communication doorbell;
   determining, by the processor based on the biometric data, an identification of the person; and
   transmitting, by the processor using the communication module, the identification of the person to the security monitoring service.

16. The method of claim 15, wherein determining the identification of the person includes comparing, by the processor, the biometric data to a biometric database.

17. The method of claim 11, wherein the threshold period of time is configurable by a user of the A/V recording and communication doorbell.

18. The method of claim 11, further comprising:
   receiving, by the processor using the communication module, from the security monitoring service, an action; and
   executing, using the communication module, the action.

19. The method of claim 18, wherein the action includes one of changing an arming status of a security system and unlocking/locking a door.

20. The method of claim 11, further comprising transmitting, by the processor using the communication module, the image data to the security monitoring service.

21. A method for a security system monitored by a security monitoring service;
   the security system comprising an audio/video recording and communication device (A/V device);
   the A/V device comprising a processor, a button, a speaker, and a microphone; and the method comprising:
      receiving, by the processor, an input in response to a press of the button;
      determining, by the processor based on the input, that the button was pressed for a threshold period of time; and
      upon determining that the button was pressed for the threshold period of time, establishing, by the processor, a two-way communication with the security monitoring service, wherein the two-way communication comprises initiating the microphone and the speaker thereby facilitating two-way audio communication between the security monitoring service and the A/V device.

* * * * *